US006138090A

United States Patent [19]

Inoue

[11] Patent Number: 6,138,090

[45] Date of Patent: Oct. 24, 2000

[54] ENCODED-SOUND-CODE DECODING METHODS AND SOUND-DATA CODING/DECODING SYSTEMS

[75] Inventor: Takeo Inoue, Hirakata, Japan

[73] Assignee: Sanyo Electric Co., Ltd., Osaka, Japan

[21] Appl. No.: 09/108,302

[22] Filed: Jul. 1, 1998

[30] Foreign Application Priority Data

| | | | |
|---|---|---|---|
| Jul. 4, 1997 | [JP] | Japan | 9-179835 |
| Dec. 25, 1997 | [JP] | Japan | 9-357475 |
| May 25, 1998 | [JP] | Japan | 10-143035 |

[51] Int. Cl.$^{7}$ .......... G01L 21/04

[52] U.S. Cl. .......... 704/212; 704/500; 704/230

[58] Field of Search .......... 714/212, 503, 714/500, 230; 370/311; 340/825.47

[56] References Cited

U.S. PATENT DOCUMENTS

| | | | |
|---|---|---|---|
| 4,142,066 | 2/1979 | Ahamed | 704/233 |
| 4,521,907 | 6/1985 | Amir et al. | 704/262 |
| 4,549,305 | 10/1985 | Fushikida | 375/244 |
| 4,813,014 | 3/1989 | DeBell | 365/45 |
| 4,989,246 | 1/1991 | Wan et al. | 704/212 |
| 5,692,099 | 11/1997 | Takahashi et al. | 704/212 |
| 5,694,518 | 12/1997 | Takahashi et al. | 704/212 |
| 5,793,756 | 8/1998 | Ayerst et al. | 704/212 |
| 5,845,242 | 12/1998 | Takahashi et al. | 704/212 |
| 5,852,805 | 12/1998 | Hiratsuka et al. | 704/500 |

*Primary Examiner*—David R. Hudspeth
*Assistant Examiner*—Daniel Abebe
*Attorney, Agent, or Firm*—Smith, Gambrell & Russell, LLP

[57] ABSTRACT

A encoded-sound-code decoding method comprises a first step of performing a decoding process on a predetermined number of sample codes starting from a sound-reproduction start position at some midpoint of a sequence of codes based on a predetermined initial value of a sound parameter; a second step of making comparison between a judgment parameter corresponding to a decoding result and a predetermined threshold value thereby determining whether the decoding result is proper or not; a third step in which, in response to a determination that the decoding result is not proper, the initial value of the sound parameter used at the first step is modified and then the processes of the first and second steps are performed; and a fourth step in which, after repetitions of the process of the third step until the decoding result is determined to be proper, the codes are sequentially decoded from the sound-reproduction start position at some midpoint of the code sequence.

33 Claims, 15 Drawing Sheets

ENCODED-SOUND-CODE DECODING METHODS AND SOUND-DATA CODING/ DECODING SYSTEMS

BACKGROUND OF THE INVENTION

1. Field of the Invention

The present invention relates generally to encoded-sound-code decoding methods and sound data coding/decoding systems wherein ADPCM (Adaptive Differential Pulse Code Modulation) codes or APCM (Adaptive Pulse Code Modulation) codes are sequentially written to storage means, such as a ring memory, the method and system adapted such that, when codes thus written to the ring memory are to be reconstructed, the codes may be read out from optional addresses in the ring memory or from addresses starting from a next address to that at which the code writing to the ring memory has been suspended, thus providing continuous sound reproduction free from break-up of the sound.

2. Background Art

The ADPCM method has been known in the art as one of the voiceband data compression techniques. In this method, as to adjacent samples representative of sound data of time $t_n$ and $t_{n+1}$, for example, a difference between a prediction value computed at time $t_n$ and the sound data of time $t_{n+1}$ is found and encoded into a difference signal. In sound reproduction, an inversely quantized value of the difference signal is found by decoding the code, and the value thus found is added with the predictive value thereby to reconstruct a sound reproduction signal. According to the ADPCM method, a quantization step size necessary for inversely quantizing the difference signal is varied based on fluctuations of input signal level.

Some of the VTRs, tape recorders and the like have a function such as to sequentially write the sound reproduction data to the ring memory and to provide repetitive reconstructions of the sound data from the ring memory when a pause command is inputted.

In the prior art systems, the PCM (Pulse Code Modulation) codes rather than the ADPCM codes are written to the ring memory, enabling the sound reproduction from any of addresses thereof. Unfortunately, however, the PCM codes have lower compression efficiencies than the ADPCM codes, thus requiring a ring memory of a greater capacity.

Let us assume a case where the ADPCM codes are written to the ring memory for permitting the use of a ring memory smaller in capacity.

FIG. 1 schematically illustrates a configuration of a sound data coding/decoding system adapted such that ADPCM encoded sound data is temporarily stored in the ring memory and then the codes thus stored are reconstructed into sound-reproduction signals for output.

An input sound signal is encoded by ADPCM coding means 1. A code $L_n$ formed by the ADPCM coding means 1 is written to a ring memory 2. In sound reproduction, a code $L_n$ is read out from the ring memory 2 to be subject to ADPCM decoding means 3 for reconstruction into a sound-reproduction signal for output.

FIG. 2 schematically illustrates a configuration of the ADPCM coding means 1.

A first algebraic adder 41 finds a difference (prediction error signal $d_n$) between an input signal $x_n$ to the ADPCM coding means 1 and a prediction signal $y_n$ by using the following equation (1)

$$d_n = x_n - y_n \tag{1}$$

An adaptive quantizer 42 forms the code $L_n$ by encoding (quantizing) the prediction error signal $d_n$ supplied from the first adder 41 based on a quantization step size $\Delta_n$. More specifically, the adaptive quantizer 42 finds the code $L_n$ based on the following equation and the resultant code $L_n$ is written to the ring memory 2:

$$L_n = [d_n/\Delta n] \tag{2}$$

where the pair of signs "[ ]" are Gauss' notation for indication of a maximum integer within a range of not greater than a numerical value parenthesized therein.

A first quantization step size updating device 43 finds a quantization step size $\Delta_{n+1}$ for the subsequent sound signal sample $\Delta_{n+1}$ by using the following equation (3) where the code $L_n$ and a function $M(L_n)$ are in a predetermined relation:

$$\Delta_{n+1} = \Delta_n \times M(L_n) \tag{3}$$

A first inverse adaptive quantizer 44 uses the code $L_n$ for decoding (inversely quantizing) the prediction error signal $d_n$ thereby to find an inversely quantized value $q_n$. More specifically, the first inverse adaptive quantizer 44 finds the inversely quantized value $q_n$ from the following equation (4):

$$q_n = (L_n + 0.5) \times \Delta_n \tag{4}$$

A second algebraic adder 45 finds a sound-reproduction signal $w_n$ based on the prediction signal $y_n$ for the present sound-signal sample $x_n$ and the inversely quantized value $q_n$. More specifically, the second adder 45 finds the sound-reproduction signal $w_n$ from the following equation (5):

$$w_n = y_n + q_n \tag{5}$$

A first predictor 46 finds a prediction signal $y_{n+1}$ for the subsequent sound-signal sample $x_{n+1}$ by delaying the sound-reproduction signal $w_n$ by one sampling time.

FIG. 3 schematically illustrates a configuration of the ADPCM decoding means 3.

A second inverse adaptive quantizer 51 assigns a code $L_n'$ supplied from the ring memory 2 and a quantization step size $\Delta_n'$ supplied from a second quantization step size updating device 52 to the following equation (6), thereby finding an inversely quantized value $q_n'$:

$$q_n' = (L_n' + 0.5) \times \Delta_n' \tag{6}$$

If the code $L_n'$ found by the ADPCM coding means 1 is correctly transmitted to the ADPCM decoding means 3 or $L_n = L_n'$, the values $q_n'$, $y_n'$, $\Delta_n'$ and $w_n'$ used by the ADPCM decoding means 3 are respectively equivalent to the values $q_n$, $y_n$, $\Delta_n$, and $w_n$ used by the ADPCM coding means 1.

The second quantization step size updating device 52 uses a code $L_n'$ supplied from the ring memory 2 for finding a quantization step size $\Delta_{n+1}'$ for the subsequent code $L_{n+1}'$ from the following equation (7), where the code $L_n'$ and a function $M(L_n')$ has the same relation as the code $L_n$ and the function $M(L_n)$ does:

$$\Delta_{n+1}' = \Delta_n' \times M(L_n') \tag{7}$$

A third algebraic adder 53 finds a sound-reproduction signal $w_n'$ based on a pre $y_n'$ supplied from a second predictor 54 and the inversely quantized value $q_n'$. That is, the third adder 53 finds the sound-reproduction signal $w_n'$ from the following equation (8):

$$w_n' = y_n' + q_n' \tag{8}$$

The resultant sound-reproduction signal $w_n'$ is outputted from the ADPCM decoding means 3.

The second predictor 54 delays the sound-reproduction signal $w_n'$ by one sampling time for finding the subsequent prediction signal $y_{n+1}'$ which is supplied to the third adder 53.

SUMMARY OF THE INVENTION

FIG. 4 is a conceptual representation of addresses in the ring memory 2.

In the writing of codes $L_n$ to the ring memory 2, the codes $L_n$ are written into addresses starting from a head address 0000H (represented in hexadecimal digit) to an end address FFFFH (represented in hexadecimal digit) and then over-written from the head address 0000H. The code writing is repeated in this manner.

In a case, as shown in FIG. 4, where after having gone through a first and second segments, the code writing process returned to the head address 0000H and codes $L_n$ have been written to the end of a third segment when a pause command is inputted, it is required to decode the codes $L_n'$ stored in the second and third segments so that sound corresponding to the codes $L_n'$ in the second and third segments is reproduced. That is, it is required to start a decoding process from some midpoint of the sequence of codes formed by the sound-signal coding means 1.

However, the ADPCM decoding process requires the quantization step size $\Delta_n$ and the inversely quantized value $y_n$ obtained from a code previous to the code to be decoded, as seen from the above equations (6) to (8). Therefore, it is impossible to start the decoding process from some midpoint of the code sequence. Hence, the codes $L_n'$ stored in the second and third segments cannot be decoded.

In view of the foregoing, it is an object of the invention to provide a encoded-sound-code decoding method and a sound-data coding/decoding system, the method and system permitting the decoding process to be started at some midpoint of a code sequence formed by a coding method in which a difference between an input signal $x_n$ and a prediction value $y_n$ for the input signal is encoded based on a quantization step size $\Delta_n$.

A first encoded-sound-code decoding method according to the invention of performing a decoding process starting from some midpoint of a code sequence formed by a coding method of performing a sound-signal coding process on a difference between an input signal $x_n$ and a prediction value $y_n$ for the input signal based on a quantization step size $\Delta_n$, the decoding method comprising the steps of: a first step of defining a predetermined value as an initial value of a sound parameter required for the decoding process; a second step of performing the decoding process on a predetermined number of sample codes starting from a sound-reproduction start position at some midpoint of the code sequence based on the initial value of the sound parameter defined at the first step; a third step of comparing a judgment parameter value in correspondence to a decoding result with a predetermined threshold value thereby determining whether the decoding result is proper or not; a fourth step in which, in response to a determination that the decoding result is proper, codes are sequentially decoded from the sound-reproduction start position at some midpoint of the code sequence based on the initial value of the sound parameter defined at the first step; a fifth step in which, in response to a determination that the decoding result is not proper, the initial value of the sound parameter defined at the first step is modified and then the processes of the second and third steps are performed; and a sixth step in which, after repetitions of the process of the fifth step until the decoding result is determined to be proper, codes are sequentially decoded from the sound-reproduction start position at some midpoint of the code sequence based on the modified initial value of the sound parameter.

Specifically, the sound parameter is a sound parameter used for forming the code sequence in the sound-signal coding process.

For example, initial values of the prediction value $y_n$ and of the quantization step size $\Delta_n$ are defined at the first step whereas the quantization step size $\Delta_n$ is modified at the fifth step. More specifically, the initial value of the prediction value $y_n$ is set to 0 while the initial value of the quantization step size $\Delta_n$ is set to 1, for example.

The judgment parameter corresponding to the decoding result is an optional one selected from the group consisting of, for example, a maximum value of amplitudes of sound-reproduction signals, a power of sound-reproduction signals, a quantization step size used for reconstructing sound-reproduction signals, and a sum of quantization step sizes used for reconstructing sound reproduction signals, or an optional combination thereof.

A second encoded-sound-code decoding method according to the invention of performing a decoding process starting from some midpoint of a sequence of codes formed by a sound-signal coding method of performing a coding process on a difference between an input signal $x_n$ and a prediction value for the input signal by using a quantization step size $\Delta_n$, the encoded-sound-code decoding method comprising the steps of: a first step of previously storing an internal parameter value used for forming a code at a predetermined sound-reproduction start position at some midpoint of the code sequence; and a second step of sequentially decoding codes from the predetermined sound-reproduction start position in the code sequence by using the internal parameter value stored at the first step.

The aforesaid internal parameter is, for example, a parameter related to a prediction value and/or a quantization step size used for finding the code at the predetermined sound-reproduction start position of the code sequence.

A first sound-data coding/decoding system according to the invention comprises: sound-signal coding means for forming a code by performing a sound-signal coding process on a difference between an input signal $x_n$ and a prediction value $y_n$ for the input signal based on a quantization step size $\Delta_n$; initial-value defining means for defining a predetermined value as an initial value of a sound parameter necessary for a encoded-sound-code decoding process; first encoded-sound-code decoding means for performing the encoded-sound-code decoding process on a predetermined number of sample codes starting from a sound-reproduction start position at some midpoint of a sequence of codes based on the initial value of the sound parameter defined by the initial-value defining means; judgment means which makes comparison between a judgment parameter value corresponding to a decoding result provided by the first encoded-sound-code decoding means and a predetermined threshold value thereby determining whether the decoding result is proper or not; second encoded-sound-code decoding means which, in response to a determination that the decoding result is proper, serves to sequentially decode codes from the sound-reproduction start position at some midpoint of the code sequence based on the initial value of the sound parameter defined by the initial-value defining means; sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which, after repetitions of the process of the sound-parameter modifying means until the decoding result is determined to be proper, sequentially decodes codes from the sound-reproduction start position at some midpoint of the code sequence by using the modified initial value of the sound parameter.

The first encoded-sound-code decoding means, the second encoded-sound-code decoding means and the third encoded-sound-code decoding means are embodied by, for example, a single encoded-sound-code decoding device.

Specifically, the sound parameter is a sound parameter used for forming the code sequence in the sound-signal coding process.

The initial-value defining means defines, for example, initial values of the prediction value $y_n$ and quantization step size $\Delta_n$ whereas the sound-parameter modifying means modifies, for example, the initial value of the quantization step size $\Delta_n$. More specifically, the initial-value defining means sets the initial value of the prediction value $y_n$ to 0 and the initial value of the quantization step size $\Delta_n$ to 1, for example.

The judgment parameter corresponding to the decoding result is an optional one selected from the group consisting of, for example, a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof.

A second sound-data coding/decoding system according to the invention comprises: sound-signal coding means for forming a code by performing a sound-signal coding process on a difference between an input signal $x_n$ and a prediction value $y_n$ for the input signal by using a quantization step size $\Delta_n$; storage means for storing the code formed by the sound-signal coding means; initial-value defining means for defining a predetermined value as an initial value of a sound parameter necessary for a encoded-sound-code decoding process; first encoded-sound-code decoding means for reading out a predetermined number of sample codes from optional addresses in the storage means and performing a encoded-sound-code decoding process on the read codes by using the initial value of the sound parameter defined by the initial-value defining means; judgment means which makes comparison between a judgment parameter corresponding to a decoding result provided by the first encoded-sound-code decoding means and a predetermined threshold value thereby determining whether the decoding result is proper or not; second encoded-sound-code decoding means which, in response to a determination that the decoding result is proper, serves to sequentially read out codes from the optional addresses in the storage means and decode the read codes based on the initial value of the sound parameter defined by the initial-value defining means; sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which, after repetitions of the process of the sound-parameter modifying means until the decoding result is determined to be proper, sequentially reads out codes from the optional addresses in the storage means and decodes the read codes by using the modified initial value of the sound parameter.

The first encoded-sound-code decoding means, the second encoded-sound-code decoding means and the third encoded-sound-code decoding means are embodied, for example, a single encoded-sound-code decoding device.

Specifically, the sound parameter is a sound parameter used for forming the code sequence in the encoded-sound-code decoding process.

The initial-value defining means defines, for example, initial values of the prediction value $y_n$ and the quantization step size $\Delta_n$, whereas the sound-parameter modifying means modifies, for example, the initial value of the quantization step size $\Delta_n$. More specifically, the initial-value defining means sets the initial value of the prediction value $y_n$ to "0" and the initial value of the quantization step size $\Delta_n$ to "1", for example.

The judgment parameter corresponding to the decoding result is an optional one selected from the group consisting of, for example, a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof. The aforesaid storage means may employ, for example, a ring memory.

A third sound-data coding/decoding system according to the invention comprises: sound-signal coding means for forming a code by performing a sound-signal coding process on a difference between an input signal $x_n$ and a prediction value $x_n$ for the input signal by using a quantization step size $\Delta_n$; a ring memory; writing means for sequentially writing to the ring memory codes formed by the sound-signal coding means; initial-value defining means for defining a predetermined value as an initial value of a sound parameter necessary for a encoded-sound-code decoding process; first encoded-sound-code decoding means which, in response to input of a command to suspend the writing of codes to the ring memory, serves to suspend the code writing to the ring memory while sequentially reading out a predetermined number of sample codes starting from a sound-reproduction start address in the ring memory, the sound-reproduction start address adjoining an address at which the command to suspend the code writing has been inputted, and then performing a encoded-sound-code decoding process on the read codes by using the initial value of the sound parameter defined by the initial-value defining means; judgment means which makes comparison between a judgment parameter corresponding to a decoding result provided by the first encoded-sound-code decoding means and a predetermined threshold value thereby determining whether the decoding result is proper or not; second encoded-sound-code decoding means which, in response to a determination that the decoding result is proper, serves to sequentially read out codes starting from the sound-reproduction start position in the ring memory and decode the read codes based on the initial value of the sound parameter defined by the initial-value defining means; sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which, after repetitions of the process of the sound-parameter modifying means until the decoding result is determined to be proper, sequentially reads out codes starting from the sound-reproduction start position in the ring memory and decodes the read codes by using the modified initial value of the sound parameter.

The first encoded-sound-code decoding means, the second encoded-sound-code decoding means and the third encoded-sound-code decoding means are embodied by, for example, a single encoded-sound-code decoding device.

Specifically, the sound parameter is a sound parameter used for forming the code sequence in the sound-signal coding process.

The initial-value defining means defines, for example, initial values of the prediction value $y_n$ and the quantization step size $\Delta_n$ whereas the sound-parameter modifying means modifies, for example, the initial value of the quantization step size $\Delta_n$. More specifically, the initial-value defining means sets the initial value of the prediction value $y_n$ to "0" and the initial value of the quantization step size $\Delta_n$ to "1", for example.

The judgment parameter corresponding to the decoding result is an optional one selected from the group consisting of, for example, a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof.

It is preferred to further provide fade-in processing means for performing a fade-in process on sound-reproduction signals reconstructed from codes in the ring memory which are read out from a predetermined number of addresses subsequent to the sound-reproduction start address inclusive; and a fade-out processing means for performing a fade-out process on sound-reproduction signals reconstructed from codes in the ring memory which are read out from a predetermined number of addresses precedent to a suspension address inclusive, the suspension address at which the suspension command has been inputted.

A fourth sound-data coding/decoding system according to the invention comprises: sound-signal coding means for forming a code by performing a sound-signal coding process on a difference between an input signal $x_n$ and a prediction value $y_n$ for the input signal by using a quantization step size $\Delta_n$; first storage means; means for sequentially writing, to the first storage means, codes formed by the sound-signal coding means; second storage means; means which operates, when a code is written in a predetermined address of addresses in the first storage means, so as to store in the second storage means, an internal parameter used by the sound-signal coding means for forming the code in the predetermined address; and encoded-sound-code decoding means for sequentially reading out codes from addresses starting from the predetermined address in the first storage means and performing the encoded-sound-code decoding process on the read codes by using the internal parameter stored in the second storage means.

The internal parameter is, for example, a parameter related to the prediction value and/or the quantization step size used for forming the code written in the aforesaid predetermined address.

The first storage means may employ a ring memory, for example. It is preferred to further provide fade-in processing means for performing a fade-in process on sound-reproduction signals reconstructed from codes read out from a predetermined number of addresses subsequent to the predetermined address inclusive; and fade-out processing means for performing a fade-out process on sound-reproduction signals reconstructed from codes read out from a predetermined number of addresses precedent to the predetermined address inclusive. The predetermined address is, for example, a head address of the ring memory.

A fifth sound-data coding/decoding system according to the invention comprises: sound-signal coding means for forming a code by performing a sound-signal coding process on a difference between an input signal $x_n$ and a prediction value $y_n$ for the input signal by using a quantization step size $\Delta_n$; a first storage means; means for sequentially writing, to the first storage means, codes formed by the sound-signal coding means; second storage means; means which operates, when a code is written into a head address of respective segmented blocks of the first storage means, so as to store in the second storage means, an internal parameter used by the sound-signal coding means for forming the code written in the head address; means which, in response to input of a command to suspend the writing of codes to the first storage means, serves to suspend the writing of codes to the first storage means while deciding, as a sound-reproduction start address, a head address of a next block to a block including an address at which the code writing is suspended; and encoded-sound-code decoding means for sequentially reading out codes from addresses starting from the sound-reproduction start address of the first storage means and performing the encoded-sound-code decoding process on the read codes by selectively using an internal parameter out of the internal parameters in the second storage means that corresponds to the code held by the sound-reproduction start address.

The aforesaid internal parameter is a parameter related to a prediction value and/or a quantization step size used for forming the code written into the predetermined address, for example.

The first storage means may employ, for example, a ring memory.

DETAILED DESCRIPTION OF PREFERRED EMBODIMENTS

[1] First Embodiment

Figure 5:
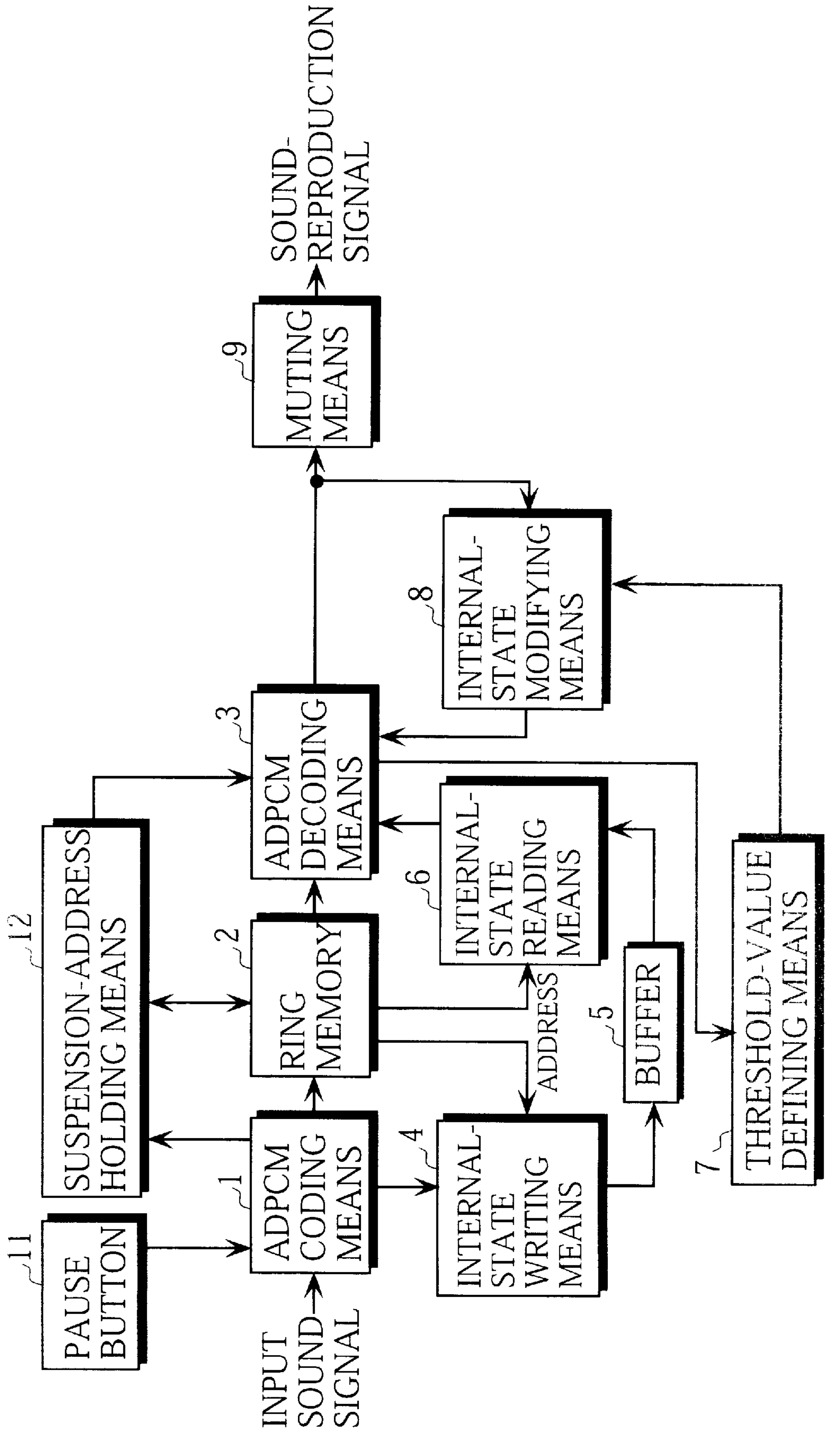
FIG. 5 is a block diagram showing an exemplary configuration of an ADPCM coding/decoding system in accordance with the invention.

FIG. 5 illustrates a configuration of an ADPCM coding/decoding system according to a first embodiment of the invention.

Figure 1:
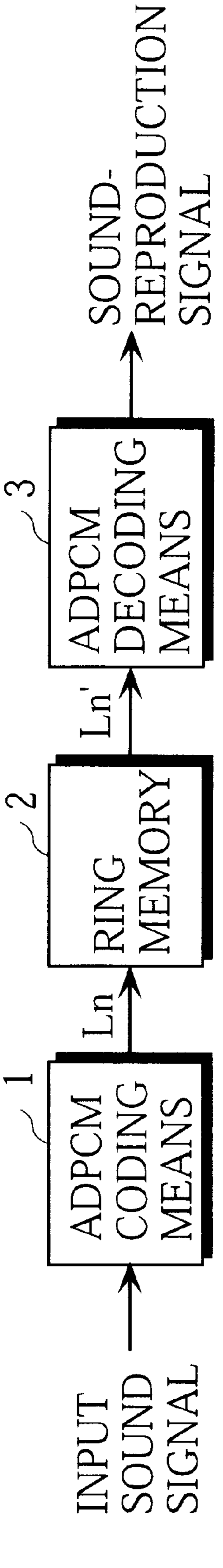
FIG. 1 is a block diagram of a sound-data coding/decoding system adapted to encode ADPCM sound data and then to reconstruct ADPCM sound-reproduction data for output.
Figure 2:
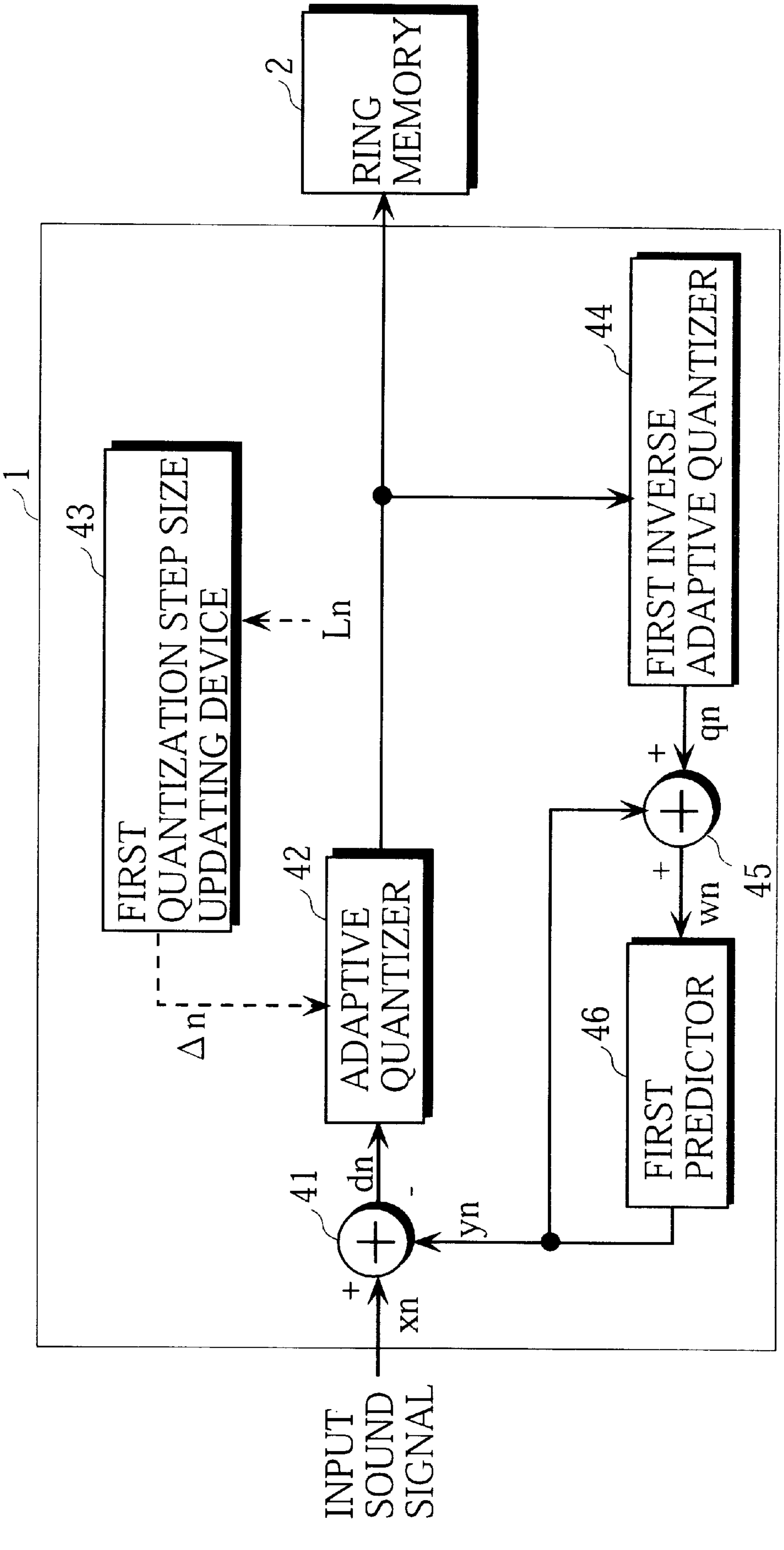
FIG. 2 is a block diagram showing a configuration of ADPCM coding means 1 in accordance with the invention.
Figure 3:
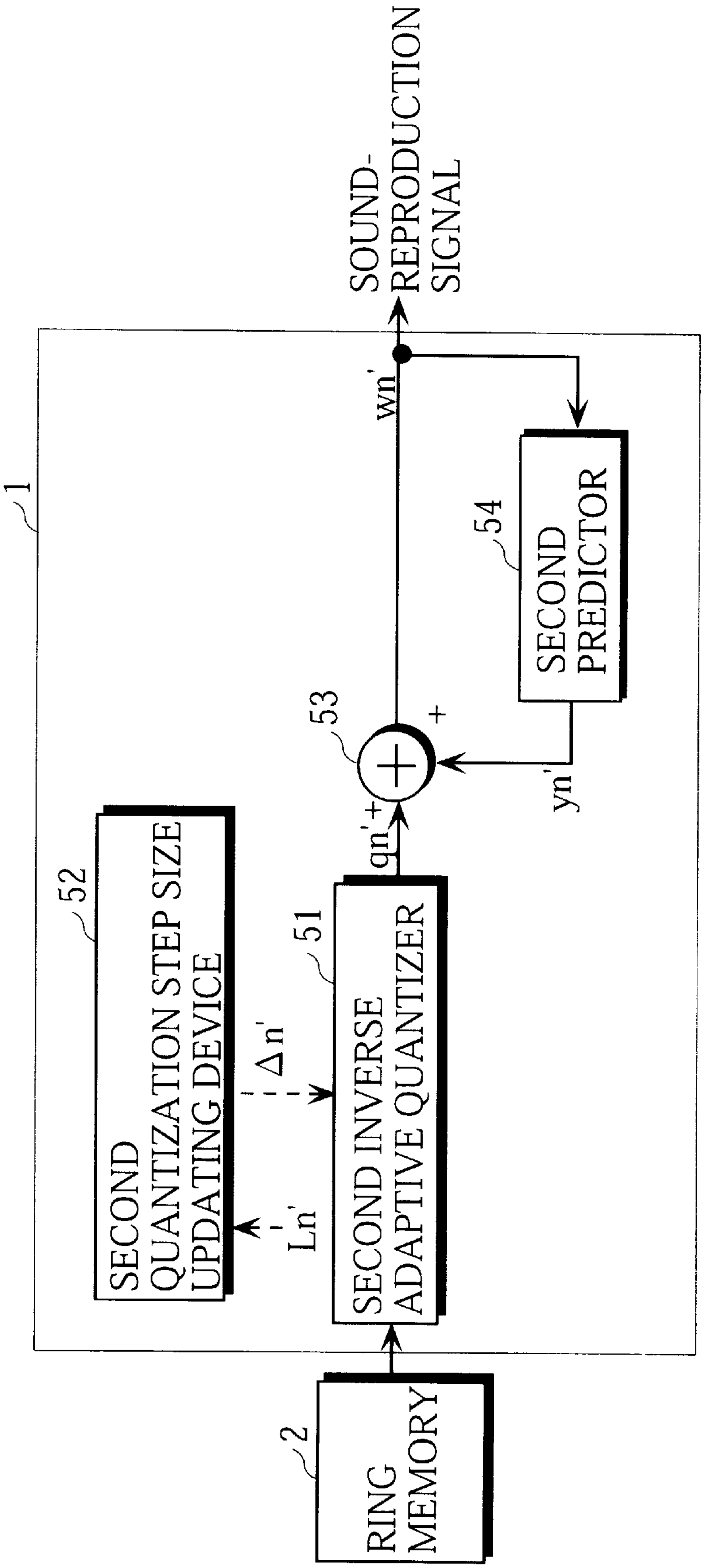
FIG. 3 is a block diagram showing a configuration of ADPCM decoding means 3 in accordance with the invention.

ADPCM coding means 1 is of a similar configuration to that of coding means 1 shown in FIG. 2 and serves to encode an input sound signal through ADPCM coding algorithm. A ring memory 2 stores a code $L_n$ formed by the ADPCM coding means 1. ADPCM decoding means 3 is of a similar configuration to that of decoding means 3 shown in FIG. 3 and serves to read out a code $L_n'$ from the ring memory 2 and decode the read code through ADPCM decoding algorithm.

When the code $L_n$ is written into a head address of the ring memory 2, internal-state writing means serves to write to a buffer 5 a prediction value $y_n$ and a quantization step size $\Delta_n$ which constitute an internal parameter used by the ADPCM coding means 1 for forming the code $L_n$. Provided that addresses in the ring memory 2 are respectively represented by symbols "0000H" to "FFFFH" in hexadecimal, "0000H" represents the head address.

It is to be noted here that although the system of this embodiment includes discrete ring memory 2 and buffer 5, the system configuration should not be limited to the embodiment. Alternatively, the ring memory and buffer may be integrated.

Internal-state reading means 6 serves to read out from the buffer 5 the prediction value $y_n$ and the quantization step size $\Delta_n$ as the internal parameter of the ADPCM coding means 1 when the ADPCM decoding means 3 reads out codes $L_n'$ from the head address in the ring memory 2.

Threshold-value defining means 7 serves to define a threshold value. In this example, a threshold value against a maximum value of amplitudes of sound-reproduction signals is set in the threshold-value defining means 7.

Internal-state modifying means 8 serves to temporarily define initial values of the prediction value $y_n$ and the quantization step size $\Delta_n$ which are used in the decoding process. Additionally, the internal-state modifying means 8 makes comparison between a maximum value of amplitudes of sound-reproduction signals outputted from the ADPCM decoding means 3 in correspondence to a predetermined number of samples, and a threshold value previously defined by the threshold-value defining means 7 and, if the maximum amplitude of the sound-reproduction signals is not greater than the threshold value, the initial value of the quantization step size $\Delta_n'$ used in the decoding process is incremented until the maximum amplitude of the sound-reproduction signals exceeds the threshold value.

A pause button 11 is used for inputting a pause command to suspend the writing of codes $L_n$, formed by the ADPCM coding means 1, to the ring memory 2 and also to cause the decoding means 3 to start the decoding process.

Suspension-address holding means 12 holds an address (hereinafter, referred to as "suspension address") at which the writing of codes $L_n$ to the ring memory 2 has been suspended in response to the pause command inputted through the pause button 11.

Muting means 9 performs a muting process on sound-reproduction signals reconstructed from codes $L_n'$ in the ring memory through the decoding process, the codes $L_n'$ read out from a predetermined number of addresses subsequent to the head address inclusive; from a predetermined number of addresses subsequent to a next address (inclusive) to a suspension address; from a predetermined number of addresses precedent to the end address inclusive; and from a predetermined number of addresses precedent to a suspension address inclusive.

The predetermined number of addresses is, for example, 128. The muting process includes a fade-in process and a fade-out process.

Figure 6:
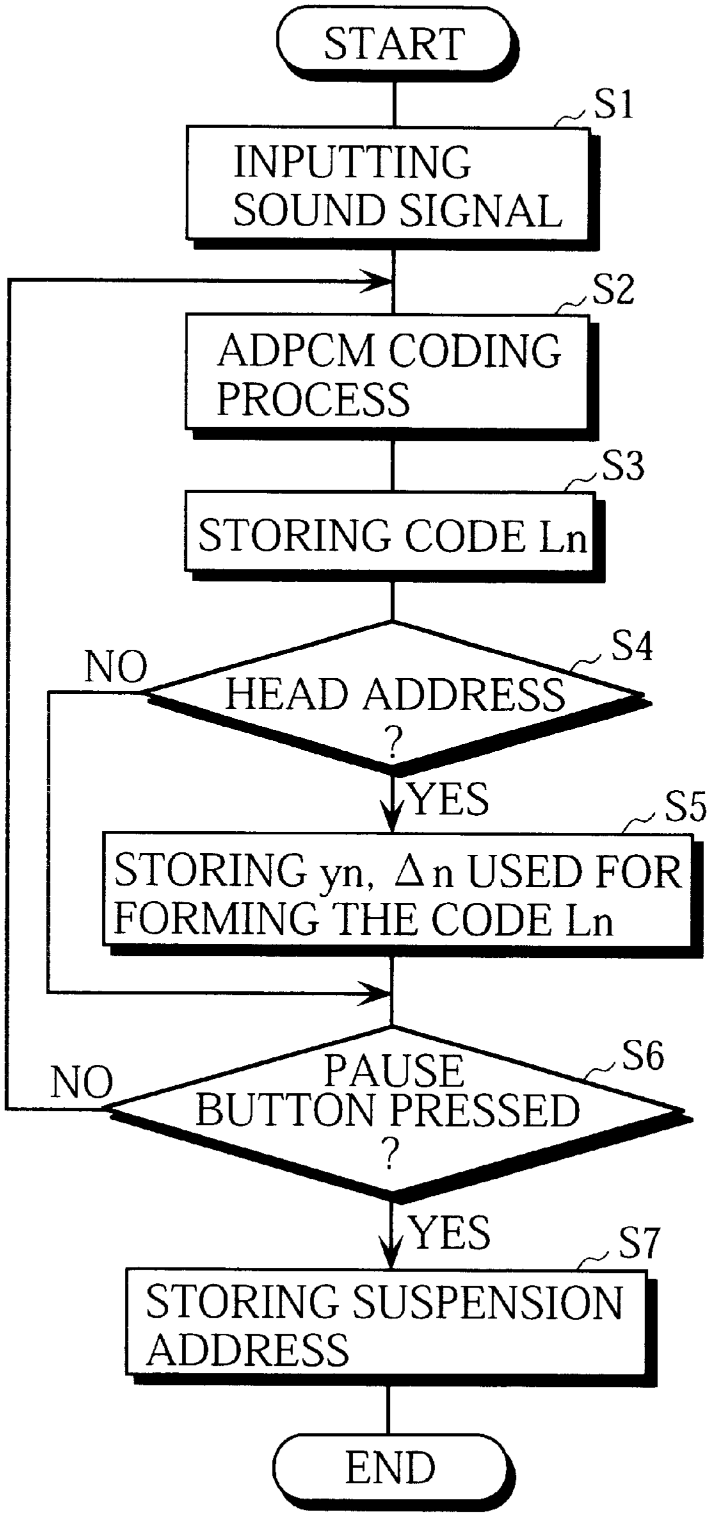
FIG. 6 is a flow chart representing steps in a coding procedure taken by the ADPCM coding/decoding system of FIG. 5.

FIG. 6 is a flow chart representing steps in a sound-signal coding procedure taken by the ADPCM coding/decoding system in accordance with the invention.

First, the ADPCM coding means 1 is sequentially supplied with sound signals sampled at a predetermined sampling period (Step S1). The input sound signals to the ADPCM coding means 1 are converted into ADPCM codes by the ADPCM coding means 1 (Step S2). Resultant codes $L_n$ formed by the ADPCM coding means 1 are stored in the ring memory 2 (Step S3).

Next, it is determined whether an address in which the code $L_n$ was stored at Step S3 is the head address or not (Step S4). If the code $L_n$ is stored in the head address, a prediction value $y_n$ and a quantization step size $\Delta_n$ as the internal parameter used by the ADPCM coding means 1 for forming the code $L_n$ are committed to storage at the buffer 5 (Step S5). Then, the process flow proceeds to Step S6.

If the code $L_n$ is not stored in the head address, the process flow skips to Step S6. At Step S6, it is determined whether the pause button 11 is pressed or not. If the pause button 11 is not pressed, the process flow returns to Step S2 for repeating Steps S2 to S6.

If it is determined at Step S6 that the pause button 11 is pressed, the writing of codes $L_n$ to the ring memory 2 is suspended while the suspension-address holding means 12 holds a suspension address (Step S7).

Figure 7:
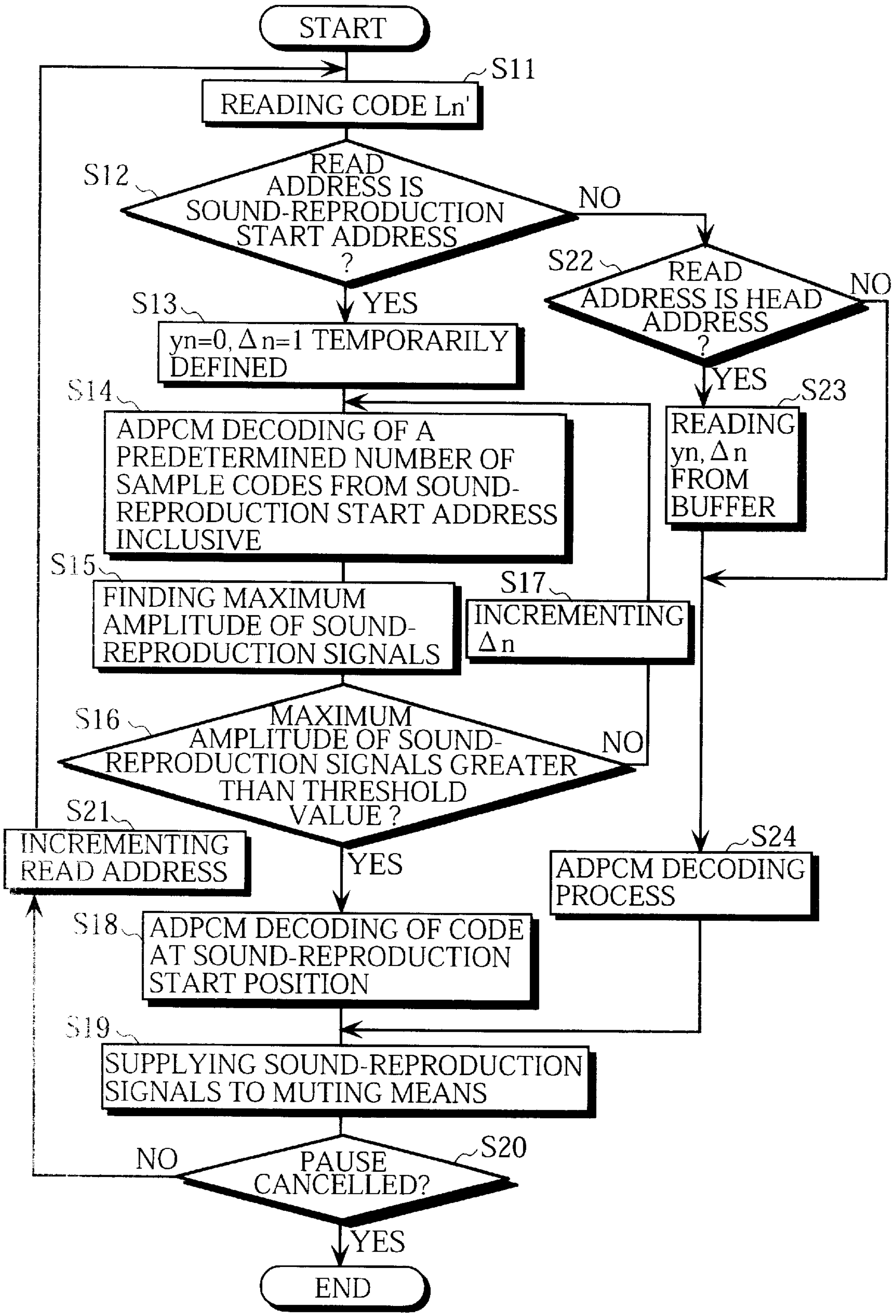
FIG. 7 is flow chart representing steps in a decoding procedure taken by the ADPCM coding/decoding system of FIG. 5.

FIG. 7 is a flow chart representing steps in the encoded-sound-code decoding procedure taken by the ADPCM coding/decoding system according to the invention.

Figure 4:
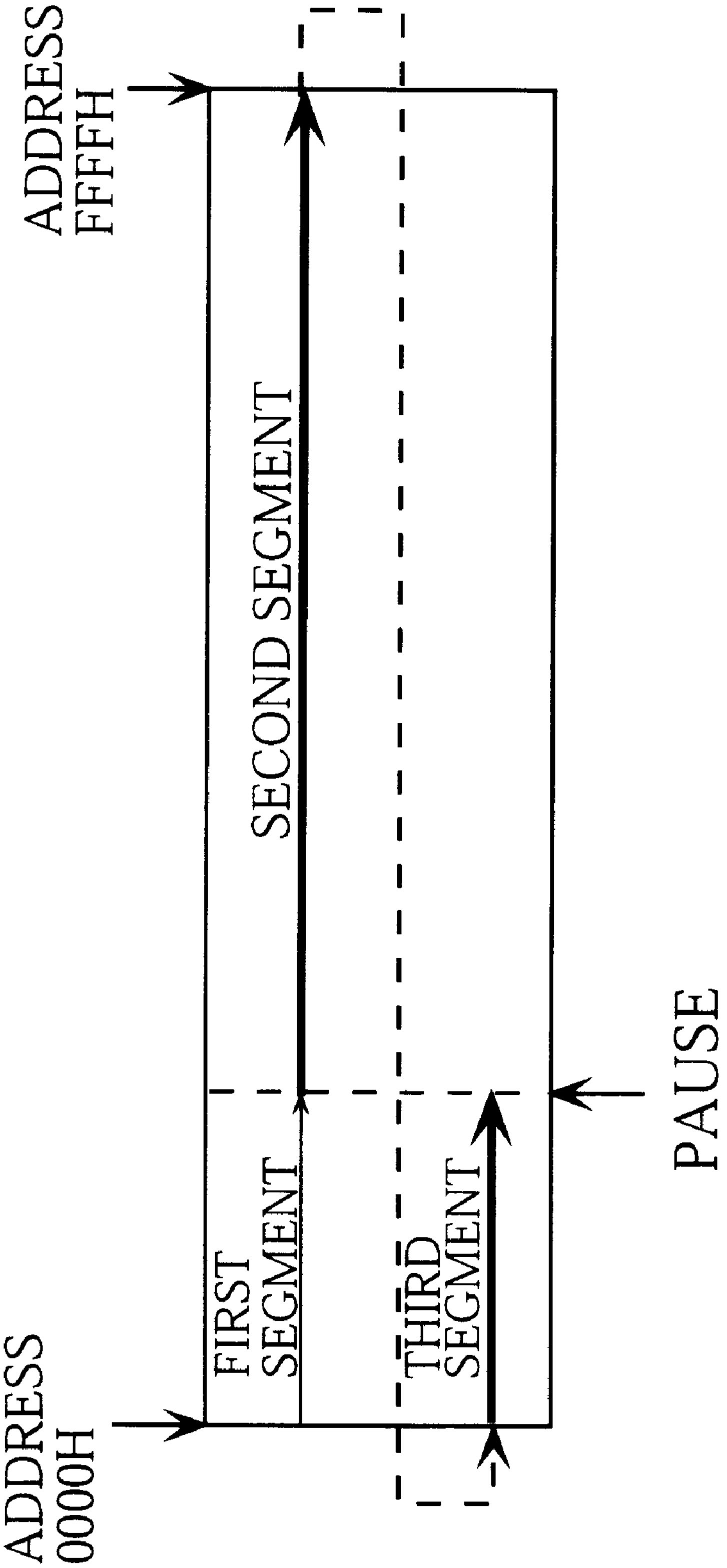
FIG. 4 schematically illustrates a state in which codes are written to a ring memory.

For example, assume that, as shown in FIG. 4, after having been written to the first and second segments, the codes $L_n$ are overwritten to the third segment from the head address 0000H to its end, when the pause command is inputted.

According to this embodiment, the writing of codes $L_n$ is suspended in response to the input of the pause command. On the other hand, started upon input of the pause command is a process for repeated reproductions of sound corresponding to codes $L_n'$ stored in the second and third segments. That is, codes $L_n'$ are read out from addresses in the second segment, from a next address to the suspension address to the end address FFFFH, so as to be subject to the decoding process and subsequently, codes $L_n'$ are read out from addresses in the third segment, from the head address 0000H to the suspension address, so as to be subject to the decoding process. Such a decoding process is repeated until a pause cancel command is inputted.

Input of the pause command causes the reading of codes $L_n'$ to be started from an address (hereinafter referred to as "sound-reproduction start address") next to the suspension address in the ring memory 2 (Step S11).

Subsequently, it is determined whether the code $L_n'$ read out at Step S11 is from the sound-reproduction start address or not (Step S12).

If it is determined that the code $L_n'$ read out at Step S11 is from the sound-reproduction start address, the internal-state modifying means 8 temporarily sets the prediction value $y_n$ to 0 ($y_n=0$) and the quantization step size $\Delta_n$ to 1 ($\Delta_n=1$) (Step S13). Then, a predetermined number of sample codes $L_n'$ (e.g., 100 samples) are read out from the corresponding number of addresses subsequent to the sound-reproduction start address inclusive so as to be sequentially decoded by the decoding means 3 (Step S14). At this time, the decoding means 3 reconstructs sound-reproduction signals from the codes $L_n'$ by using the initial values of the prediction value $y_n$ and quantization step size $\Delta_n$ which have been temporarily defined at Step S13.

Subsequently, the internal-state modifying means 8 determines a maximum value of amplitudes of the sound-reproduction signals reconstructed by the decoding means 3 (Step S15). The internal-state modifying means 8 checks the maximum amplitude of the sound reproduction signals to determine whether the maximum amplitude thereof is greater or not than the threshold value defined by the threshold-value defining means 7(Step S16). If the maximum amplitude of the sound-reproduction signals is not greater than the threshold value defined by the threshold-value defining means 7, the internal-state modifying means 8 increases the initial value of the quantization step size $\Delta_n$ by a predetermined quantity (Step S17). Then, the process flow returns to Step 14 for repeating Steps S14 to S17.

That is, the processes of Steps S14 to S17 are repeated until it is determined at Step S16 that the maximum value of amplitudes of the sound-reproduction signals is greater than the threshold value defined by the threshold-value defining means 7. The sound-reproduction signals are not outputted during the performance of the processes of Steps S14 to S17.

If it is determined at Step S16 that the maximum amplitude of the sound-reproduction signals is greater than the threshold value defined by the threshold-value defining means 7, the initial value of the quantization step size $\Delta_n$ is determined to be modified to a suitable level so that the read-out address is returned to the sound-reproduction start address from which the reading of codes $L_n'$ from the ring memory 2 is started. The codes $L_n'$ read out from addresses subsequent to the sound-reproduction start address inclusive are decoded by the decoding means 3. At this time, the decoding means 3 reconstructs sound-reproduction signals from the supplied codes $L_n'$ by using the initial value ($y_n=0$) of the prediction value $y_n$ defined at Step S13 and the initial value of the quantization step size $\Delta_n$, which was modified at Step S17 (Step S18).

The sound-reproduction signals thus reconstructed by the decoding means 3 are supplied to the muting means 9 (Step S19).

Then, it is determined whether the pause command is canceled or not (Step S20). If the pause command is not canceled, the read-out address is incremented by one (Step S21) before the process flow returns to Step S11. If the pause command is canceled, the present decoding process is terminated.

The muting means 9, in turn, checks the read address of the code $L_n'$ corresponding to the sound-reproduction signal to determine, as will be described hereinafter, whether or not to perform the muting process. If it is not required to perform the muting process, the muting means 9 outputs the supplied sound-reproduction signals as they are. If the muting process is required, the muting means 9 performs the muting process on the sound-reproduction signal supplied thereto before outputting the resultant signal.

If it is determined at Step S12 that the code $L_n'$ read out at Step S11 is not from the sound-reproduction start address, then the code $L_n'$ in question is checked to determine whether it was read out from the head address of the ring memory 2 at Step S11 or not (Step S22).

If the code $L_n'$ read out at Step S11 is not from the head address, the code $L_n'$ read out at Step S11 is reconstructed into a sound-reproduction signal by the decoding means 3 (Step S24) and the resultant sound-reproduction signal is supplied to the muting means 9 (Step S19).

If it is determined at Step S22 that the code $L_n'$ read out at Step S11 is from the head address of the ring memory 2, the internal-state reading means 6 reads from the buffer 5 the prediction value $y_n$ and the quantization step size $\Delta_n$ corresponding to the code (Step S23), so that the code $L_n'$ read out at Step S11 is decoded by the decoding means 3. At the decoding means 3 performs the decoding process by using, as initial values, the prediction value $y_n$ and the quantization step size $\Delta_n$ read out by the internal-state reading means 6.

The resultant sound-reproduction signal is supplied to the muting means 9(Step S19).

Figure 8:
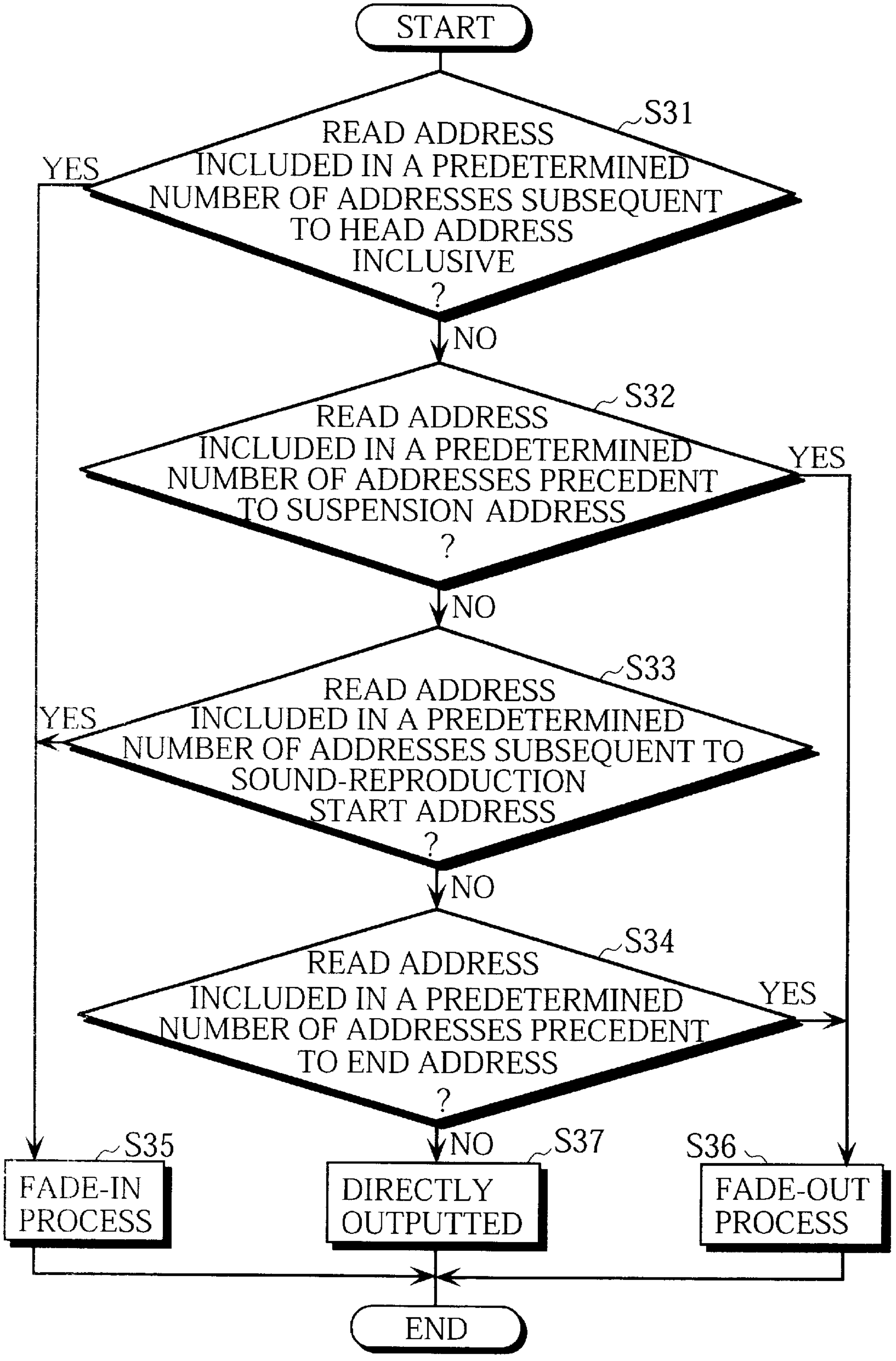
FIG. 8 is a flow chart representing steps in a procedure taken by muting means of FIG. 5.

FIG. 8 is a flow chart representing steps in procedure taken by the muting means 9.

First, it is determined whether or not the code $L_n'$ corresponding to the supplied sound-reproduction signal was read out from any one of a predetermined number of addresses (equal to the number of samples) subsequent to the head address (inclusive) in the ring memory (Step S31).

If the code $L_n'$ corresponding to the supplied sound-reproduction signal is from any one of the predetermined number of addresses (equal to the number of samples) subsequent to the head address inclusive (YES at Step S31), the fade-in process is performed (Step S35). That is, the sound-reproduction signal is multiplied by a weighting factor linearly varying from 0 to 1 before outputted.

If the code $L_n'$ corresponding to the supplied sound-reproduction signal is not from any one the predetermined number of addresses (equal to the number of samples) subsequent to the head address inclusive (NO at Step S31), then the code $L_n'$ corresponding to the supplied sound-reproduction signal is checked to determine whether it was read out from any one of the predetermined number of addresses (equal to the number of samples) precedent to a suspension address inclusive or not (Step S32).

If the code $L_n'$ corresponding to the supplied sound-reproduction signal was from any one of the predetermined number of addresses (equal to the number of samples) precedent to the suspension address inclusive (YES at Step S32), then the code is subject to the fade-out process (Step S36). That is, the sound-reproduction signal is multiplied by a weighting factor linearly varying from 1 to 0 before outputted.

If the code $L_n'$ corresponding to the supplied sound-reproduction signal was not from any one of the predetermined number of addresses (equal to the number of samples) precedent to the suspension address inclusive (NO at Step S32), then the code $L_n'$ is checked to determine whether it was from any one of the predetermined number of addresses (equal to the number of samples) subsequent to a sound-reproduction start address inclusive (Step S33).

If the code $L_n'$ corresponding to the supplied sound-reproduction signal was from any one of the predetermined number of addresses (equal to the number of samples) subsequent to the sound-reproduction start address inclusive (YES at Step S33), then the code is subject to the fade-in process (Step S35). That is, the sound-reproduction signal is multiplied by the weighting factor linearly varying from 0 to 1 before outputted.

If the code $L_n'$ corresponding to the supplied sound-reproduction signal was not from any one of the predetermined number of addresses (equal to the number of samples) subsequent to the sound-reproduction start address inclusive (NO at Step S33), then the code $L_n'$ corresponding to the supplied sound-reproduction signal is checked to determine whether it was from any one of the predetermined number of addresses (equal to the number of samples) precedent to the end address inclusive (Step S34).

If the code $L_n'$ corresponding to the supplied sound-reproduction signal was from any one of the predetermined number of addresses (equal to the number of samples) precedent to the end address inclusive (YES at Step S34), then the code is subject to the fade-out process (Step S36). That is, the sound-reproduction signal is multiplied by the weighting factor linearly varying from 1 to 0 before outputted.

If the code $L_n'$ corresponding to the supplied sound-reproduction signal was not from any one of the predetermined number of addresses (equal to the number of samples) precedent to the end address inclusive (NO at Step S34), the supplied sound-reproduction signal is outputted as they are (Step S37).

Now referring to FIG. 9, detailed description will be made on the process performed by the muting means 9.

First, assume that the "predetermined number of samples" at Steps S31 to S34 is 128 and the suspension address is at 8888H.

Figure 9:
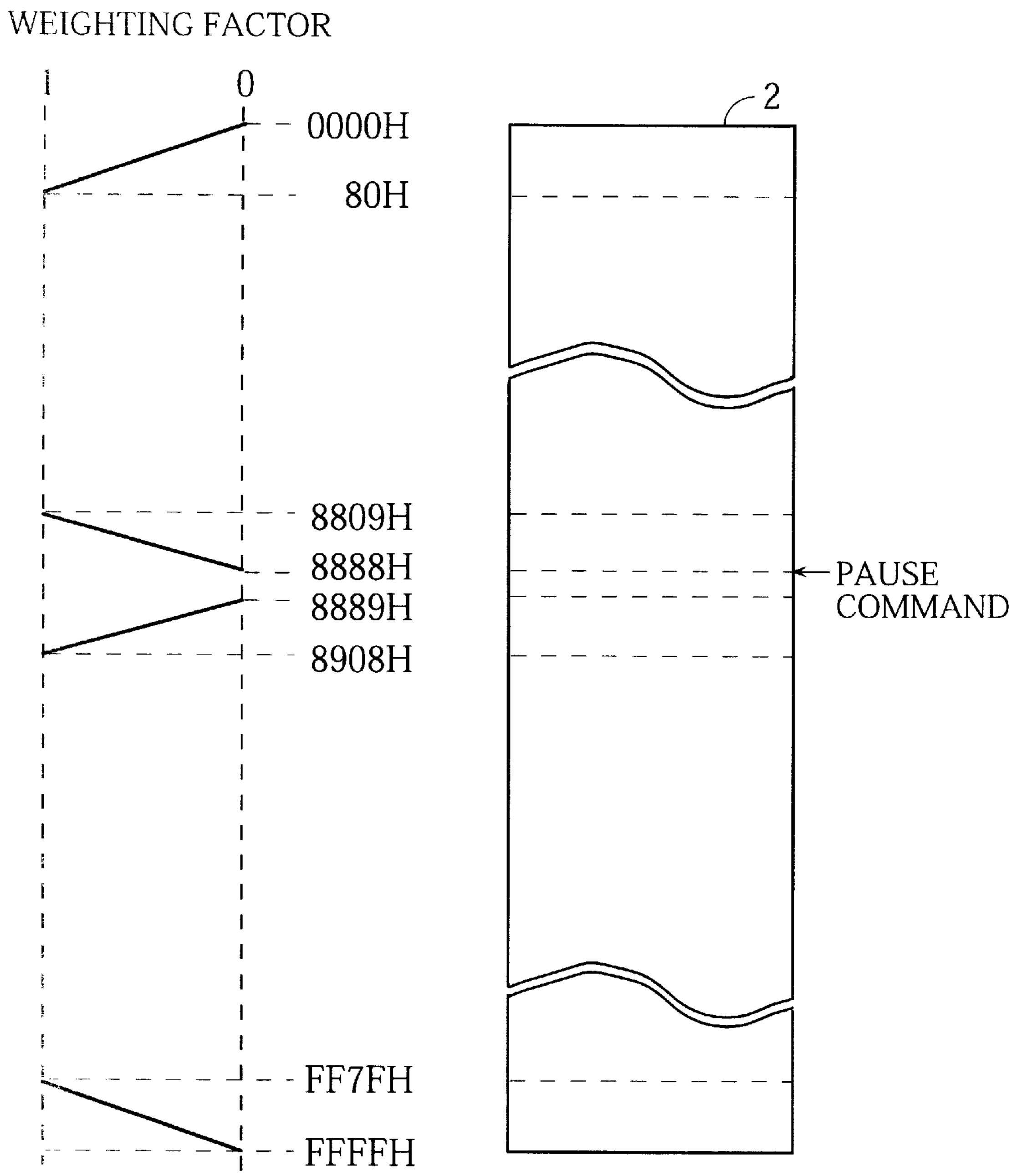
FIG. 9 is a schematic diagram for specifically illustrating a process performed by the muting means of FIG. 5.

When codes $L_n'$ read from addresses of from the head address 0000H to 80H of the ring memory 2 are reconstructed into sound-reproduction signals for outputting reproduced sound, the sound-reproduction signals are multiplied by the weighting factor linearly varying from 0 to 1, as shown in FIG. 9 (fade-in process).

When codes $L_n'$ read from addresses of from 8809H to a suspension address 8888H of the ring memory 2 are reconstructed into sound-reproduction signals for outputting reproduced sound, the sound-reproduction signals are multiplied by the weighting factor linearly varying from 1 to 0, as shown in FIG. 9 (fade-out process).

When codes $L_n'$ read from addresses of from a sound-reproduction start address 8889H to 8908H of the ring memory 2 are reconstructed into sound-reproduction signals for outputting reproduced sound, the sound-reproduction signals are multiplied by the weighting factor linearly varying from 0 to 1, as shown in FIG. 9 (fade-in process).

When codes $L_n'$ read from addresses of from FF7FH to the end address FFFFH of the ring memory 2 are reconstructed into sound-reproduction signals for outputting reproduced sound, the sound-reproduction signals are multiplied by the weighting factor linearly varying from 1 to 0, as shown in FIG. 9 (fade-out process).

In this manner, the fade-in process or the fade-out process is carried out in order to prevent the break-up of the reproduced sound outputted.

According to the above embodiment hereof, the internal-state modifying means 8 modifies the quantization step size width $\Delta_n$ based on the comparison between the maximum amplitude of the sound-reproduction signals and the threshold value but modification of the quantization step size should not depend upon the above comparison alone. Alternatively, the modification may be made based on comparison between any one of the following parameters (hereinafter referred to as "judgment parameter") and the threshold value:

(a) variation range of amplitudes of sound-reproduction signals;

(b) power of sound-reproduction signals;

(c) maximum value of quantization step size used for reconstruction of sound-reproduction signals;

(d) sum of quantization step sizes for a predetermined number of samples;

(e) maximum value of amplitudes of sound-reproduction signals reconstructed from a desired number of last samples (preferably 1–100) included in a predetermined number of samples decoded;

(f) variation range of amplitudes of sound-reproduction signals reconstructed from a desired number of last samples (preferably 1–100) included in a predetermined number of samples decoded;

(g) power of sound-reproduction signals reconstructed from a desired number of last samples included in a predetermined number of samples decoded;

(h) maximum value of quantization step sizes for sound-reproduction signals reconstructed from a desired number of last samples included in a predetermined number of samples; and (i) sum of quantization step sizes for sound-reproduction signals reconstructed from a desired number of last samples included in a predetermined number of samples.

In a case where "a maximum value of amplitudes" is used as the judgment parameter, for example, a threshold value defined by the threshold-value defining means 7 is preferably smaller than "a maximum value of amplitudes" of previously reproduced sound for output. This is on grounds that with the threshold value set to a greater level than "the maximum value of amplitudes" of the previously reproduced sound, the resultant output sound has an extremely great amplitude, thus grating upon listeners' ears. This is demonstrated by experiments made by the inventors.

In a case where "power of reproduced sound" is used as the judgment parameter, for example, the threshold-value defining means 7 can also find a threshold value from a power of the prediction value $y_n$ determined by the sound-signal coding means 1. Additionally, it is preferred to find the target threshold value from a power P of sound-reproduction signals given by the following equation (9) with a desired number of samples represented by M, or from a mean power given by dividing the power P by the desired number of samples M:

$$P=(y_n)^2+(y_{n+1})^2+(y_{n+2})^2+\dots+(y_{n+M-1})^2 \tag{9}$$

In a case where "maximum value of quantization step sizes" or "sum of quantization step sizes" is used as the judgment parameter, for example, the threshold-value defining means 7 can find a threshold value from a value of the quantization step size $\Delta_n$ or a sum of quantization step sizes $\Delta_n$ for a predetermined number of samples, which quantization step size(s) are used by the sound-signal coding means 1. In this case, the threshold value is preferably set to a level smaller than the maximum value of the quantization step size $\Delta_n$ or the sum of quantization step sizes $\Delta_n$.

Figure 10:
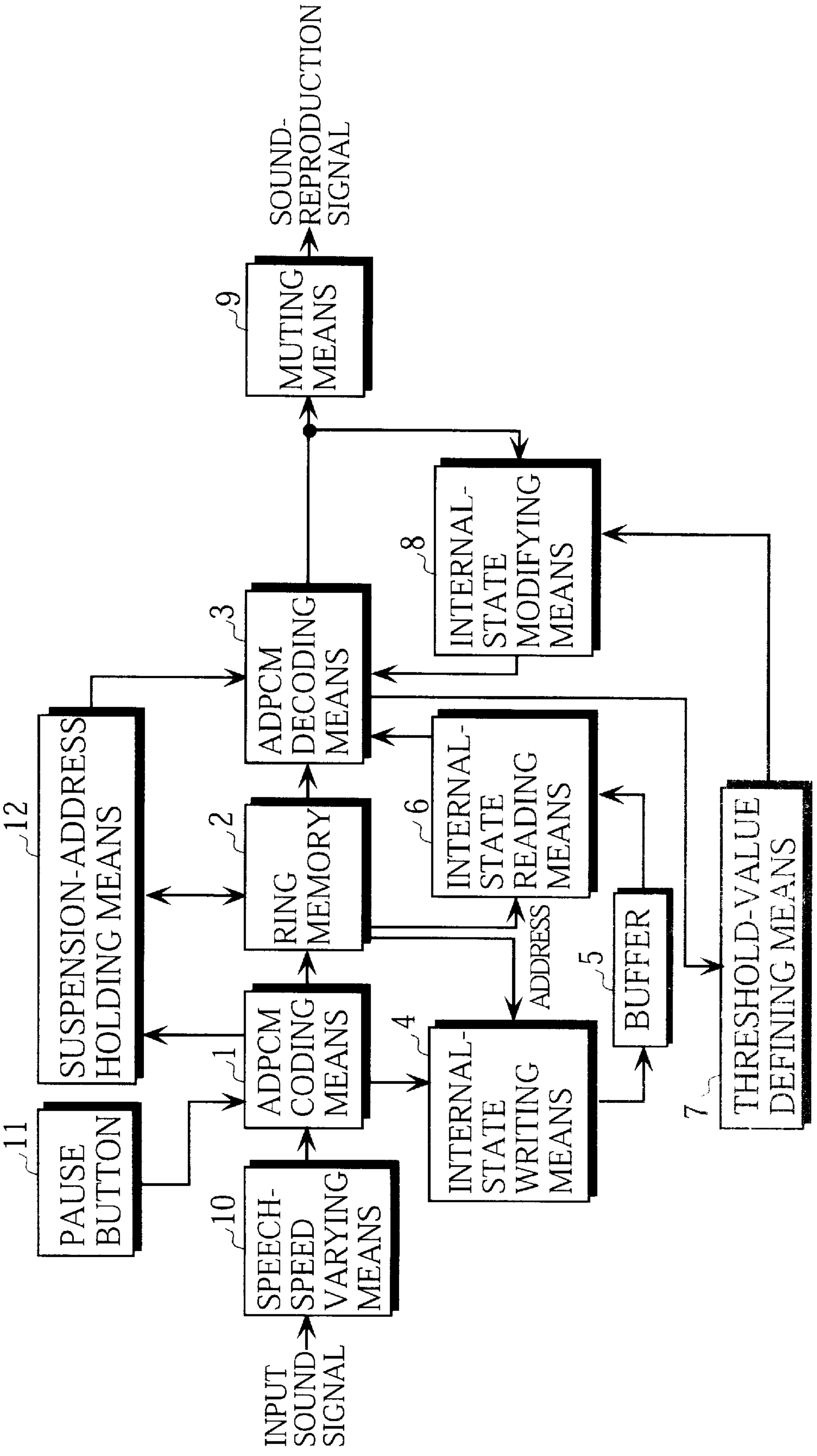
FIG. 10 is a block diagram showing another exemplary configuration of the ADPCM coding/decoding system in accordance with the invention.

As seen in FIG. 10, there may be provided previous to the ADPCM coding means 1, speech-speed varying means 10 which serves to eliminate a silence segment through detection of a sound segment and the silence segment in an input sound signal and to reduce/extend the sound segment on a time-axis basis thereby to suitably change an output speed of reproduced sound. Such a speech-speed varying means 10 is set forth in detail in U.S. Pat. No. 5,611,018.

[Second Embodiment]

Figure 11:
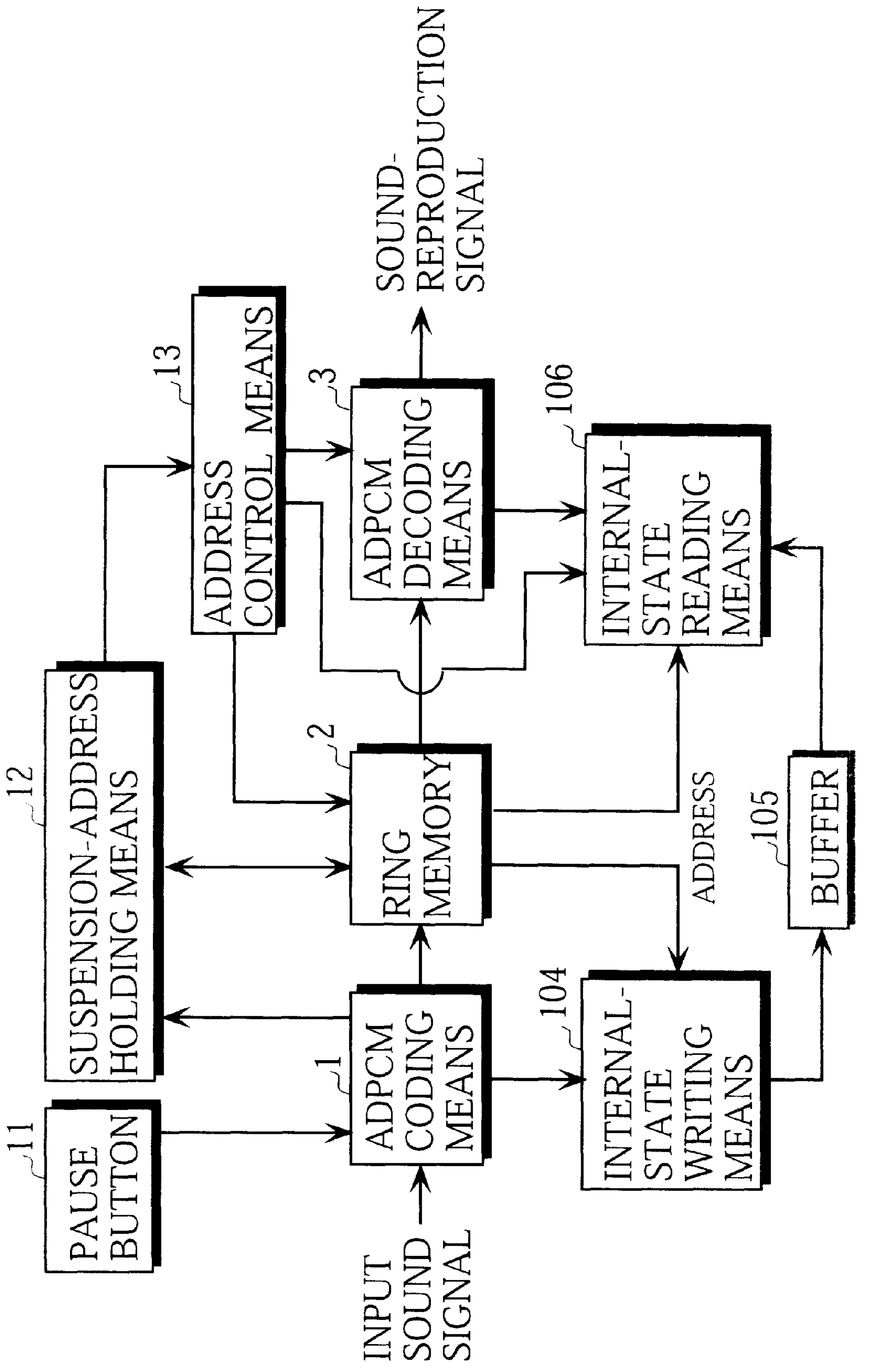
FIG. 11 is a block diagram showing still another exemplary configuration of the ADPCM coding/decoding system in accordance with the invention.

FIG. 11 illustrates a configuration of a ADPCM coding/decoding system according to a second embodiment hereof. In the figure, like parts to those in FIG. 5 are represented by like reference symbols, respectively, and the description thereof is omitted.

Figure 12:
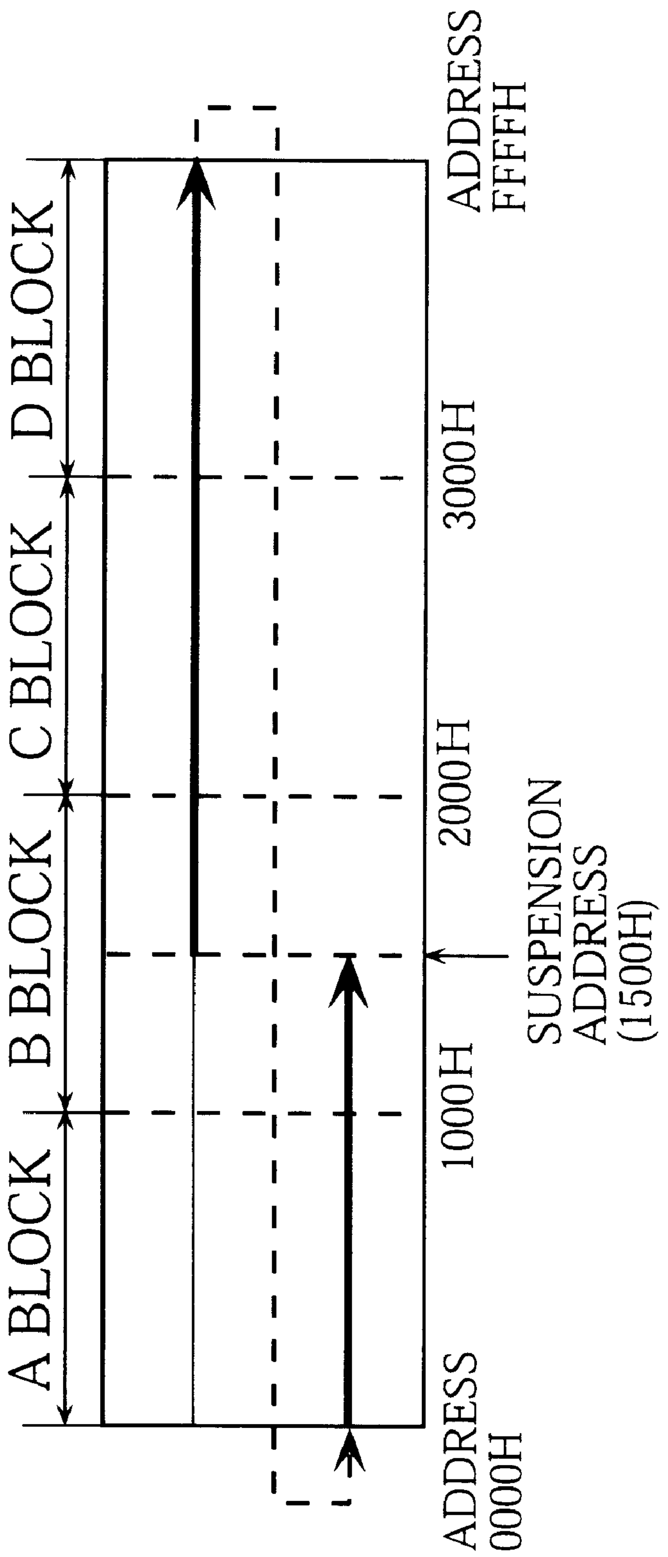
FIG. 12 is a schematic diagram for illustrating operations performed by the ADPCM coding/decoding system of FIG. 11.

FIG. 12 is a conceptual representation of addresses in the ring memory 2. As seen in the figure, a storage region in the ring memory 2 is divided into a plurality of blocks. In this example, the storage region of the ring memory 2 is divided into four blocks of A to D.

In writing codes $L_n$ to the ring memory 2, the codes $L_n$ formed by the ADPCM coding means 1 are sequentially written into the A block, B block, C block and D block to the end address, and then the codes $L_n$ are overwritten from the head address of the A block in the above order.

Assume that after having been sequentially written into the blocks A to D, the codes $L_n$ are overwritten from the head address 0000H to some midpoint in the B block when the pause command is inputted, as shown in FIG. 12. According to the second embodiment of the invention, a sound-reproduction start address in a decoding process is not a next address to the suspension address but a head address of a next block (C block in this example) to a block (B block in this example) including an address(suspension address) at which the pause command was inputted.

Address control means 13 shown in FIG. 11 store respective head addresses of the blocks in the ring memory, such as 0000H of the A block, 1000H of the B block, 2000H of the C block and 3000H of the D block.

Additionally, the address control means 13 also decides a sound-reproduction start address based on a suspension address which is sent from the suspension-address holding means 12 in response to input of the pause command. More specifically, the address control means designates a head address of a next block to a block including the suspension address as the sound-reproduction start address and posts the sound-reproduction address thus decided to the ADPCM decoding means 3 and an internal-state reading means 106.

Information on the respective head addresses of the blocks A to D stored in the address control means 13 is sent therefrom to an internal-state writing means 104 via an unillustrated route.

The internal-state writing means 104 serves to write to a buffer 105 prediction values $y_n$ and quantization step sizes $\Delta_n$ used to form codes $L_n$ written in the respective head addresses 0000H, 1000H, 2000H and 3000H of the blocks A to D in the ring memory 2.

The internal-state reading means 106 serves to select a target prediction value $y_n$ and quantization step size $\Delta_n$ from the prediction values $y_n$ and the quantization step sizes $\Delta_n$ stored in the buffer 105 in correspondence to the respective head addresses 0000H, 1000H, 2000H and 3000H of the blocks A to D, and read therefrom the target prediction value and quantization step size corresponding to the sound-reproduction start address designated by the address control means 13. Subsequently, the internal-state reading means posts the prediction value and quantization step size to the ADPCM decoding means 3.

Figure 13:
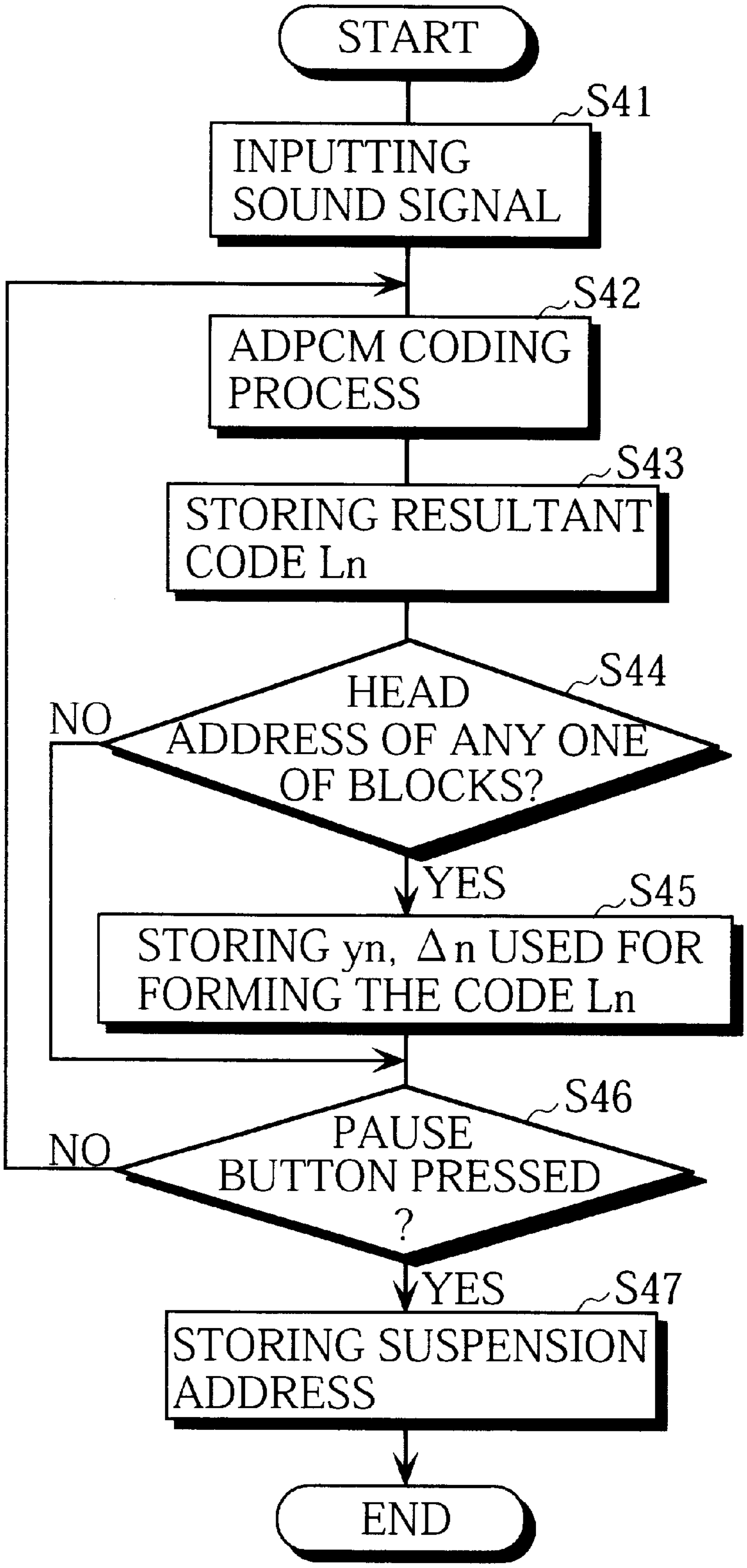
FIG. 13 is a flow chart representing steps in a coding procedure taken by the ADPCM coding/decoding system of FIG. 11.

FIG. 13 is a flow chart representing steps in sound-signal coding procedure taken by the ADPCM coding/decoding system according to this embodiment of the invention.

First, sound signals sampled at a predetermined sampling period are sequentially inputted to the ADPCM coding means 1 (Step S41). The ADPCM coding means 1 converts the input sound signals thereto into ADPCM codes (Step S42). The resultant codes $L_n$ are committed to storage at the ring memory 2 (Step S43).

Next, an address in which a code $L_n$ was written at Step S43 is checked to determine whether the address is any one of the head addresses of the blocks A to D (Step S44). If the address holding the code $L_n$ is any one of the head addresses of the blocks A to D, a prediction value $y_n$ and a quantization step size $\Delta_n$ used by the ADPCM coding means 1 to form the above code $L_n$ are stored in the buffer 105 as associated with the aforesaid head address of the block (Step S45). Then, the process flow proceeds to Step S46.

If the address holding the code $L_n$ is not any one of the head addresses of the blocks A to D, the process flow proceeds to Step S46. At Step S46, it is determined whether the pause button 11 is pressed or not. If the pause button 11 is not pressed, the process flow returns to Step S42 for repeating Steps S42 to S46.

If it is determined at the above Step S46 that the pause button 11 is pressed, the writing of codes $L_n$ to the ring memory 2 is suspended while the suspension-address holding means 12 stores a suspension address (Step S47).

Figure 14:
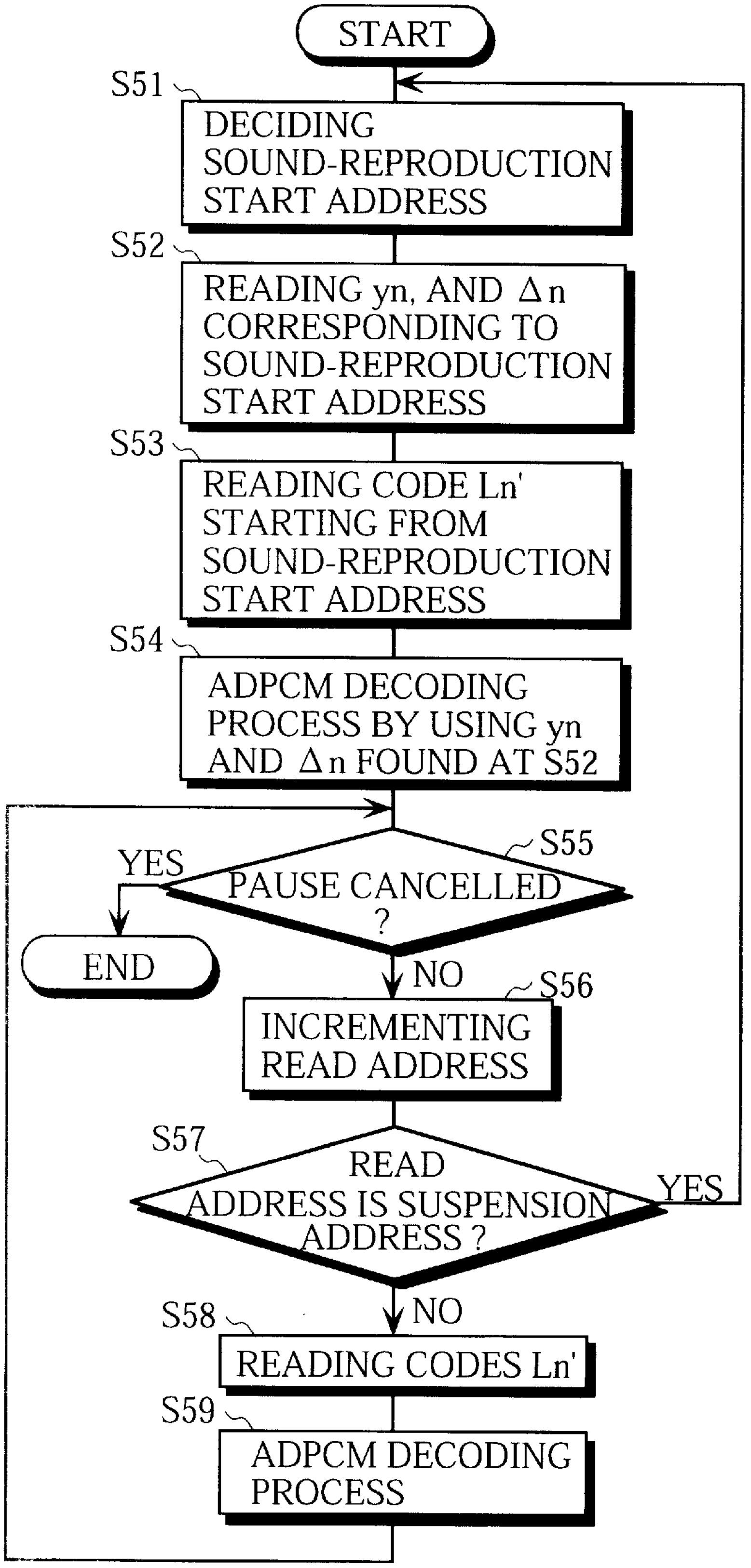
FIG. 14 is a flow chart representing steps in a decoding procedure taken by the ADPCM coding/decoding system of FIG. 11.

FIG. 14 is a flow chart representing steps in a encoded-sound-code decoding procedure taken by the ADPCM coding/decoding system hereof.

The address control means 13 designates, as the sound-reproduction start address, a head address of the next block to a block including the suspension address, which is stored in the suspension-address holding means 12, and posts the sound-reproduction start address thus designated to the ADPCM decoding means 3 and to the internal-state reading means 106 (Step S51).

The internal-state reading means 106 selects a target prediction value $y_n$ and quantization step size $\Delta_n$ from those stored in the buffer 105 in correspondence to the respective head addresses of the blocks A to D and reads therefrom the target prediction value and quantization step size in correspondence to the sound-reproduction start address designated by the address control means 13 (Step S52).

The ADPCM decoding means 3 reads out the code $L_n'$ from the sound-reproduction start address (Step S53) and performs the decoding process on the read code by using the prediction value $y_n$ and the quantization step size $\Delta_n$ in correspondence to the sound-reproduction start address as initial values thereof, the prediction value and quantization step size supplied from the internal-state reading means 106 (Step S54).

Subsequently, it is determined whether the pause command is canceled or not (Step S55). If the pause command is not canceled, the read address is incremented by one (Step S56).

Then, the read address so incremented is checked to determine whether it is the suspension address or not (Step S57). If the above read address is not the suspension address, the ADPCM decoding means 3 reads out a code $L_n'$ from the read address updated at Step S56 (Step S58) for performing the decoding process thereon (Step S59). Subsequently, the process flow returns to Step S55.

Accordingly, the processes of Steps S55 to S59 are repeated until the read address is incremented to the suspension address. When the read address reaches the suspension address, the process at Step S55 gives a determination of "YES" so that the process flow returns to Step S51.

It is to be understood that if it is determined at Step S55 that the pause command is canceled, the present decoding process is terminated.

As seen in FIG. 12, if a pause command is inputted during the writing of a code in the address 1500H at a midpoint of the block B. the address 1500H is held by the suspension-address holding means 12. On the other hand, the head address 2000H of the block C is designated as the sound-reproduction start address.

The internal-state reading means 106, in turn, reads out from the buffer 105 a prediction value $y_n$ and the quantization step size $\Delta_n$ corresponding to the sound-reproduction start address 2000H. The encoded-sound-code decoding means 3 repeatedly reads out codes $L_n'$ held by addresses from the suspension address 1500H to the head address 2000H of the C block, performing the decoding process thereon by using, as initial values thereof, the prediction value $y_n$ and quantization step size $\Delta_n$ supplied from the internal-state reading means 106. In this embodiment, therefore, the codes $L_n'$ held by the addresses from the suspension address 1500H to the head address 2000H (not inclusive) of the block C are not reconstructed into original signals.

In the second embodiment hereof, as well, the muting process may be performed on sound-reproduction signals before output. More specifically, when codes $L_n'$ held by 128 addresses subsequent to the sound-reproduction start address 2000H inclusive (i.e., 128 samples) are reconstructed into sound signals for output, the resultant sound-reproduction signals are multiplied by a weighting factor linearly varying from 0 to 1 before output. On the other hand, when codes $L_n'$ held by 128 addresses precedent to the suspension address 1500H inclusive (i.e., 128 samples) are reconstructed into sound-reproduction signals for output, the resultant sound-reproduction signals are multiplied by a weighting factor linearly varying from 1 to 0 before output.

The aforementioned first embodiment of the invention has been described by way of example where the codes $L_n$ are stored in the ring memory. However, the present invention is also applicable to communication systems without the ring memory 2, such as cellular phones.

Figure 15:
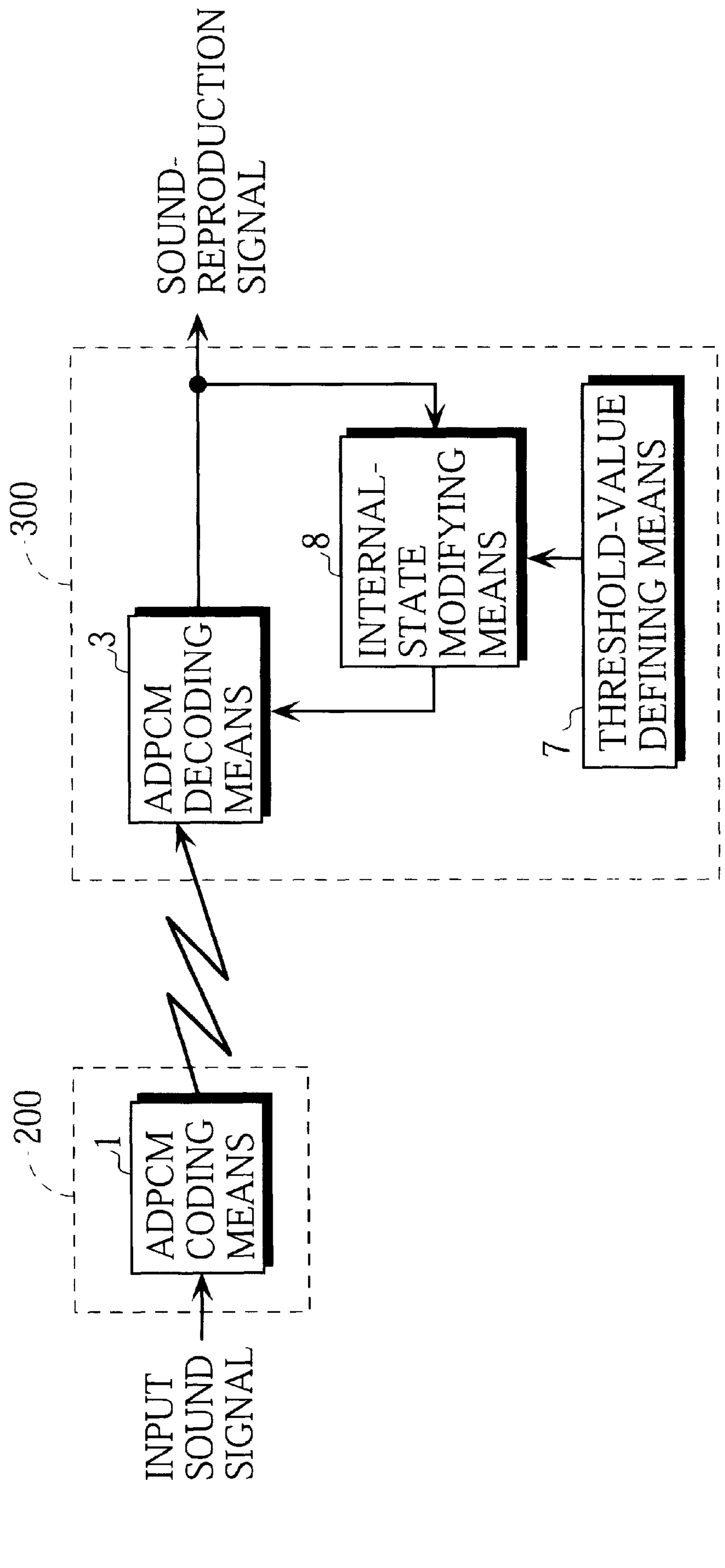
FIG. 15 is a block diagram showing yet another exemplary configuration of the ADPCM coding/decoding system in accordance with the invention.

That is, as shown in FIG. 15, the invention is applicable to a communication system consisting of a transmitter 200 including the ADPCM coding means 1 according to the first embodiment hereof, and a receiver 300 including the ADPCM decoding means 3, the threshold-defining means 7 and the internal-state modifying means 8 according to the first embodiment hereof.

Even if a part of content of received information is missed due to effects of a building or the like on radio waves transmitted from the transmitter 200, the ADPCM decoding means 3 of the receiver 300 is capable of reconstructing signals corresponding to the missed codes through the ADPCM decoding process utilizing the threshold-value defining means 7 and the internal-state modifying means 8.

It should be understood that although the foregoing embodiments hereof have been described by way of example of the ADPCM coding/decoding processes, the invention is not limited to the ADPCM coding/decoding method. As a matter of course, the invention is also applicable to the prior-art coding/decoding methods, such as a APCM coding/decoding method, wherein the sound-signal coding process for the present code is performed by using a sound parameter determined by the previous sound-signal coding process.

What is claimed is:

1. A encoded-sound-code decoding method of performing a decoding process starting from some midpoint of a sequence of codes formed by a coding method of performing a sound-signal coding process on a difference between an input signal $x_n$ and a prediction value $y_n$ for the input signal by using a quantization step size $\Delta_n$, the encoded-sound-code decoding method comprising the steps of:

a first step of defining a predetermined value as an initial value of a sound parameter necessary for the decoding process;

a second step of performing the decoding process on a predetermined number of sample codes starting from a sound-reproduction start position at some midpoint of the code sequence based on the initial value of the sound parameter defined at the first step;

third step of comparing a judgment parameter value in correspondence to a decoding result with a predetermined threshold value thereby determining whether the decoding result is proper or not;

a fourth step in which, in response to a determination that the decoding result is proper, codes are sequentially decoded from said sound-reproduction start position at some midpoint of the code sequence based on the initial value of the sound parameter defined at the first step;

a fifth step in which, in response to a determination that the decoding result is not proper, the initial value of the sound parameter defined at the first step is modified and then the processes of the second and third steps are performed; and a sixth step in which, after repetitions of the process of the fifth step until the decoding result is determined to be proper, codes are sequentially decoded from said sound-reproduction start position at some midpoint of the code sequence based on the modified initial value of the sound parameter.

2. A encoded-sound-code decoding method as set forth in claim 1, wherein said sound parameter is a sound parameter used for forming the code sequence in the sound-signal coding process.

3. A encoded-sound-code decoding method as set forth in claim 1, wherein initial values of the prediction value $y_n$ and of the quantization step size $\Delta_n$ are defined at said first step and the initial value of the quantization step size $\Delta_n$ is modified at said fifth step.

4. A encoded-sound-code decoding method as set forth in claim 3, wherein the initial value of the prediction value $y_n$ is set to 0 and the initial value of the quantization step size $\Delta_n$ is set to 1 at the first step.

5. A encoded-sound-code decoding method as set forth in claim 1, wherein the judgment parameter value in correspondence to the decoding result is an optional one selected from the group consisting of a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof.

6. A encoded-sound-code decoding method of performing a decoding process starting from some midpoint of a sequence of codes formed by a sound-signal coding method of performing a coding process on a difference between an input signal $x_n$ and a prediction value $y_n$ for the input signal by using a quantization step size $\Delta_n$, the encoded-sound-code decoding method comprising the steps of:

a first step of previously storing an internal parameter value used for forming a code at a predetermined sound-reproduction start position at some midpoint of the code sequence; and a second step of sequentially decoding codes from said predetermined sound-reproduction start position in said code sequence by using the internal parameter value stored at the first step.

7. A encoded-sound-code decoding method as set forth in claim 6, wherein said internal parameter value is a parameter related to a prediction value and/or a quantization step size used for forming the code at said predetermined sound-reproduction start position in said code sequence.

8. A sound-data coding/decoding system comprising:

sound-signal coding means for forming a code by performing a sound-signal coding process on a difference between an input signal $x_n$ and a prediction value $y_n$ for the input signal based on a quantization step size $\Delta_n$;

initial-value defining means for defining a predetermined value as an initial value of a sound parameter necessary for a encoded-sound-code decoding process;

first encoded-sound-code decoding means for performing the encoded-sound-code decoding process on a predetermined number of sample codes starting from a sound-reproduction start position at some midpoint of a sequence of codes based on the initial value of the sound parameter defined by the initial-value defining means;

judgment means which makes comparison between a judgment parameter value corresponding to a decoding resul $y_n$ t provided by the first encoded-sound-code decoding means and a predetermined threshold value thereby determining whether the decoding result is proper or not;

second encoded-sound-code decoding means which, in response to a determination that the decoding result is proper, serves to sequentially decode codes from said sound-reproduction start position at some midpoint of the code sequence based on the initial value of the sound parameter defined by the initial-value defining means;

sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which after repetitions of the process of the sound-parameter modifying means until the decoding result is determined to be proper, sequentially decodes codes from said sound-reproduction start position at some midpoint of the code sequence by using the modified initial value of the sound parameter.

9. A sound-data coding/decoding system as set forth in claim 8, wherein said sound parameter is a sound parameter used for forming the code sequence in the sound-signal coding process.

10. A sound-data coding/decoding system as set forth in claim 8, wherein said initial-value defining means defines initial values of the prediction value $y_n$ and the quantization step size $\Delta_n$ and said sound-parameter modifying means modifies the initial value of the quantization step size $\Delta_n$.

11. A sound-data coding/decoding system as set forth in claim 10, wherein said initial-value defining means sets the initial value of the prediction value $y_n$ to 0 and the initial value of the quantization step size $\Delta_n$ to 1.

12. A sound-data coding/decoding system as set forth in claim 8, wherein the judgment parameter corresponding to the decoding result is an optional one selected from the group consisting of a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof.

13. A sound-data coding/decoding system comprising:

sound-signal coding means for forming a code by performing a sound-signal coding process on a difference between an input signal $x_n$ and a prediction value for the input signal by using a quantization step size $\Delta_n$;

storage means for storing the code formed by said sound-signal coding means;

initial-value defining means for defining a predetermined value as an initial value of a sound parameter necessary for a encoded-sound-code decoding process;

first encoded-sound-code decoding means for reading out a predetermined number of sample codes from optional addresses in said storage means and performing a encoded-sound-code decoding process on the read codes by using the initial value of the sound parameter defined by the initial-value defining means;

judgment means which makes comparison between a judgment parameter corresponding to a decoding result provided by the first encoded-sound-code decoding means and a predetermined threshold value thereby determining whether the decoding result is proper or not;

second encoded-sound-code decoding means which, in response to a determination that the decoding result is proper, serves to sequentially read out codes from the optional addresses in said storage means and decode the read codes based on the initial value of the sound parameter defined by the initial-value defining means;

sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which after repetitions of the process of the sound-parameter modifying means until the decoding result is determined to be proper, sequentially reads out codes from the optional addresses in said storage means and decodes the read codes by using the modified initial value of the sound parameter.

14. A sound-data coding/decoding system as set forth in claim 13, wherein said sound parameter is a sound parameter used for forming a sequence of codes in the sound-signal coding process.

15. A sound-data coding/decoding system as set forth in claim 13, wherein said initial-value defining means defines initial values of the prediction value $y_n$ and the quantization step size $\Delta_n$, and said sound-parameter modifying means modifies the initial value of the quantization step size $\Delta_n$.

16. A sound-data coding/decoding system as set forth in claim 15, wherein said initial-value defining means sets the initial value of the prediction value to 0 and the initial value of the quantization step size $\Delta_n$ to 1.

17. A sound-data coding/decoding system as set forth in claim 13, wherein the judgment parameter in correspondence to the decoding result is an optional one selected from the group consisting of a maximum value of amplitudes of sound-reproduction signals, a power of sound-reproduction signals, a quantization step size used for reconstructing sound-reproduction signals and a sum of quantization step sizes used for reconstructing sound-reproduction signals, or an optional combination thereof.

18. A sound-data coding/decoding system as set forth in claim 13, wherein said storage means is a ring memory.

19. A sound-data coding/decoding system comprising:

sound-signal coding means for forming a code by performing a sound-signal coding process on a difference between an input signal $x_n$ and a prediction value $y_n$ for the input signal by using a quantization step size $\Delta_n$;

a ring memory;

writing means for sequentially writing to the ring memory codes formed by said sound-signal coding means;

initial-value defining means for defining a predetermined value as an initial value of a sound parameter necessary for a encoded-sound-code decoding process;

first encoded-sound-code decoding means which, in response to input of a command to suspend said code writing to the ring memory, serves to suspend the writing of codes to the ring memory while sequentially reading out a predetermined number of sample codes starting from a sound-reproduction start address in the ring memory, the sound-reproduction start address adjoining an address at which said command to suspend the code writing has been inputted, and then performing a encoded-sound-code decoding process on the read codes by using the initial value of the sound parameter defined by said initial-value defining means;

judgment means which makes comparison between a judgment parameter corresponding to a decoding result provided by the first encoded-sound-code decoding means and a predetermined threshold value thereby determining whether the decoding result is proper or not;

second encoded-sound-code decoding means which, in response to a determination that the decoding result is proper, serves to sequentially read out codes starting from said sound-reproduction start position in said ring memory and decode the read codes based on the initial value of the sound parameter defined by the initial-value defining means;

sound-parameter modifying means which, in response to a determination that the decoding result is not proper, serves to modify the initial value of the sound parameter used by the first encoded-sound-code decoding means and permit the processes of the first encoded-sound-code decoding means and the judgment means to be performed; and third encoded-sound-code decoding means which, after repetitions of the process of the sound-parameter modifying means until the decoding result is determined to be proper, sequentially reads out codes starting from said sound-reproduction start position in said ring memory and decodes the read codes by using the modified initial value of the sound parameter.

20. A sound-data coding/decoding system as set forth in claim 19, wherein said sound parameter is a sound parameter used for forming a sequence of codes in the sound-signal coding process.

21. A sound-data coding/decoding system as set forth in claim 19, wherein said initial-value defining means defines initial values of the prediction value $y_n$ and the quantization step size $\Delta_n$and said sound-parameter modifying means modifies the initial value of the quantization step size $\Delta_n$.

22. A sound-data coding/decoding system as set forth in claim 21, wherein said initial-value defining means sets the initial value of the prediction value $y_n$ to 0 and the initial value of the quantization step size $\Delta_n$ to 1.

23. A sound-data coding/decoding system as set forth in claim 19, wherein the judgment parameter in correspondence to the decoding result is an optional one selected from the group consisting of a maximum value of amplitudes of sound-reproduction signals, a power of sound-reproduction signals, a quantization step size used for reconstructing sound-reproduction signals, and a sum of quantization step sizes used for reconstructing sound-reproduction signals, or an optional combination thereof.

24. A sound-data coding/decoding system as set forth in claim 19, further comprising:

fade-in processing means for performing a fade-in process on sound-reproduction signals reconstructed from codes in the ring memory which are read out from a predetermined number of addresses subsequent to said sound-reproduction start address inclusive; and fade-out processing means for performing a fade-out process on sound-reproduction signals reconstructed from codes in the ring memory which are read out from a predetermined number of addresses precedent to a suspension address inclusive, the suspension address at which said suspension command has been inputted.

25. A sound-data coding/decoding system comprising:

sound-signal coding means for forming a code by performing a sound-signal coding process on a difference between an input signal $x_n$ and a prediction value $y_n$ for the input signal by using a quantization step size $\Delta_n$;

first storage means;

means for sequentially writing, to the first storage means, codes formed by said sound-signal coding means;

second storage means;

means which operates, when a code is written in a predetermined address of addresses in said first storage means, so as to store in the second storage means, an internal parameter used by said sound-signal coding means for forming the code in the predetermined address; and encoded-sound-code decoding means for sequentially reading out codes from addresses starting from said predetermined address in said first storage means and performing the encoded-sound-code decoding process on the read codes by using the internal parameter stored in said second storage means.

26. A sound-data coding/decoding system as set forth in claim 25, wherein said internal parameter is a parameter related to a prediction value and/or a quantization step size used for forming the code written in said predetermined address.

27. A sound-data coding/decoding system as set forth in claim 25, wherein said first storage means is a ring memory.

28. A sound-data coding/decoding system as set forth in claim 25, further comprising:

fade-in processing means for performing a fade-in process on sound-reproduction signals reconstructed from codes read out from a predetermined number of addresses subsequent to said predetermined address inclusive; and fade-out processing means for performing a fade-out process on sound-reproduction signals reconstructed from codes read out from a predetermined number of addresses precedent to said predetermined address inclusive.

29. A sound-data coding/decoding system as set forth in claim 25, wherein said predetermined address is a head address of the ring memory.

30. A sound-data coding/decoding system comprising:

sound-signal coding means for forming a code by performing a sound-signal coding process on a difference between an input signal $x_n$ and a prediction value $y_n$ for the input signal by using a quantization step size $\Delta_n$;

first storage means;

means for sequentially writing, to said first storage means, codes formed by said sound-signal coding means;

second storage means;

means which operates, when a code is written into a head address of respective segmented blocks of said first storage means, so as to store in the second storage means, an internal parameter used by said sound-signal coding means for forming the code written in the head address;

means which, in response to input of a command to suspend the writing of codes to said first storage means, serves to suspend the writing of codes to said first storage means while deciding, as a sound-reproduction start address, a head address of a next block to a block including an address at which the code writing is suspended; and encoded-sound-code decoding means for sequentially reading out codes from addresses starting from said sound-reproduction start address in said first storage means and performing the encoded-sound-code decoding process on the read codes by selectively using an internal parameter out of the internal parameters in said second storage means that corresponds to the code held by said sound-reproduction start address.

31. A sound-data coding/decoding system as set forth in claim 30, wherein said internal parameter is a parameter related to a prediction value and/or a quantization step size used for forming the code written in the sound-reproduction start address.

32. A sound-data coding/decoding system as set forth in claim 30 wherein said first storage means is a ring memory.

33. A sound-data coding/decoding system as set forth in claim 30, further comprising:

suspension address storage means for storing an address at which the writing of codes to said first storage means is suspended when the command to suspend the writing of codes to said first storage means is inputted;

fade-in processing means for performing a fade-in process on sound-reproduction signals reconstructed from codes which are read out from a predetermined number of addresses subsequent to said sound-reproduction start address inclusive; and fade-out processing means for performing a fade-out process on sound-reproduction signals reconstructed from codes which are read out from a predetermined number of addresses precedent to said suspension address inclusive.

* * * * *